United States Patent
Pierce et al.

(10) Patent No.: US 10,503,361 B2
(45) Date of Patent: Dec. 10, 2019

(54) INTERACTIVE GRAPHICAL OBJECT

(71) Applicant: Samsung Electronics Company, Ltd., Suwon, Gyeong gi-Do (KR)

(72) Inventors: Jeffrey S. Pierce, Sunnyvale, CA (US); Mike Digman, Mountain View, CA (US); Ranhee Chung, San Francisco, CA (US); Sokhav Nget, Santa Clara, CA (US); Sangwoo Han, Sunnyvale, CA (US); Junyeon Cho, Sunnyvale, CA (US)

(73) Assignee: Samsung Electronics Company, Ltd., Suwon (KR)

( * ) Notice: Subject to any disclaimer, the term of this patent is extended or adjusted under 35 U.S.C. 154(b) by 620 days.

(21) Appl. No.: 15/061,758

(22) Filed: Mar. 4, 2016

(65) Prior Publication Data
US 2017/0090695 A1  Mar. 30, 2017

Related U.S. Application Data

(60) Provisional application No. 62/234,988, filed on Sep. 30, 2015.

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0486* (2013.01); *G06F 3/0488* (2013.01); *G06F 3/04817* (2013.01); *G06F 3/04883* (2013.01)

(58) Field of Classification Search
CPC .. G06F 3/0482; G06F 3/04842; G06F 3/0481; G06F 17/30247; G06F 3/0488;
(Continued)

(56) References Cited

U.S. PATENT DOCUMENTS

| 7,030,861 B1 | 4/2006 | Westerman |
| 8,448,083 B1 | 5/2013 | Migos |

(Continued)

FOREIGN PATENT DOCUMENTS

| EP | 1962480 A2 | 8/2008 |
| EP | 2192477 A1 | 6/2010 |
| WO | WO 2014/160917 A1 | 10/2014 |

OTHER PUBLICATIONS

Zahang et al.; Free-Hand Gesture control with "touchable" Virtual Interface for Human-3DTV Interaction; 2015; IEEE; 4 pages.*

(Continued)

*Primary Examiner* — Linh K Pham
(74) *Attorney, Agent, or Firm* — Baker Botts L.L.P.

(57) ABSTRACT

In one embodiment, a method includes detecting user input linked to a portion of a graphical user interface associated with one or more applications. The method further includes rendering, in response to the detected user input, at least a portion of a transient graphical object that is made up of several portions. Each portion is associated with a different virtual space, and each portion contains content including at least: 1) information linked to a particular one of the one or more applications; and 2) one or more graphical control objects for initiating one or more actions linked to the particular application.

20 Claims, 21 Drawing Sheets

(51) Int. Cl.
*G06F 3/0488* (2013.01)
*G06F 3/0486* (2013.01)
*G06F 3/0481* (2013.01)

(58) Field of Classification Search
CPC . G06F 17/30557; G06F 3/017; G06F 3/04817
See application file for complete search history.

(56) References Cited

U.S. PATENT DOCUMENTS

| | | | |
|---|---|---|---|
| 8,730,190 B2 | 5/2014 | Moloney | |
| 8,775,957 B2 * | 7/2014 | Kim | G06F 1/1626 |
| | | | 715/765 |
| 8,875,051 B2 | 10/2014 | Costenaro | |
| 8,902,182 B2 | 12/2014 | Rydenhag | |
| 8,977,978 B2 | 3/2015 | Cho | |
| 2009/0307631 A1 | 12/2009 | Kim | |
| 2011/0016390 A1 | 1/2011 | Oh | |
| 2011/0273479 A1 * | 11/2011 | Ingrassia, Jr. | G06F 3/04883 |
| | | | 345/666 |
| 2012/0331424 A1 | 12/2012 | Lazaridis | |
| 2013/0179796 A1 | 7/2013 | BianRosa | |
| 2013/0246970 A1 | 9/2013 | Helle | |
| 2013/0305187 A1 | 11/2013 | Phillips | |
| 2014/0053116 A1 | 2/2014 | Smith | |
| 2014/0075388 A1 | 3/2014 | Kuscher | |
| 2014/0164972 A1 * | 6/2014 | Lee | G06F 3/04886 |
| | | | 715/772 |
| 2014/0189523 A1 | 7/2014 | Shuttleworth | |
| 2014/0191986 A1 | 7/2014 | Kim | |
| 2014/0253463 A1 | 9/2014 | Hicks | |
| 2015/0022467 A1 | 1/2015 | Takayama | |
| 2015/0146925 A1 | 5/2015 | Son | |
| 2015/0186348 A1 | 7/2015 | Hicks | |
| 2016/0259497 A1 * | 9/2016 | Foss | G06F 3/0482 |
| 2016/0291731 A1 * | 10/2016 | Liu | G06F 1/1656 |
| 2016/0349850 A1 * | 12/2016 | Tsuda | B60K 37/06 |
| 2016/0378318 A1 * | 12/2016 | Tsuju | G06F 3/0488 |
| | | | 715/835 |
| 2017/0109011 A1 * | 4/2017 | Jiang | G06F 1/1694 |

OTHER PUBLICATIONS

International Search Report and Written Opinion for International Application No. PCT/KR2016/010726, dated Dec. 26, 2016.
Extended European Search Report for EP Application No. 16852025.2-1221, dated Jul. 23, 2018.

* cited by examiner

INTERACTIVE GRAPHICAL OBJECT

RELATED APPLICATION

This application claims the benefit, under 35 U.S.C. § 119(e), of U.S. Provisional Patent Application No. 62/234,988, filed 30 Sep. 2015, which is incorporated herein by reference.

TECHNICAL FIELD

This disclosure generally relates to user interfaces for user devices.

BACKGROUND

Mobile user devices provide a user with access to computing capabilities even as the user moves about various locations. Examples of mobile user devices include mobile phones, media players, laptops, tablets, personal data assistants (PDAs), or hybrid devices that include functionality of multiple devices of this type.

Mobile user devices may be part of a communication network such as a local area network, wide area network, cellular network, the Internet, or any other suitable network. A mobile user device may use a communication network to communicate with other user devices, for example, to access remotely-stored data, access remote processing power, access remote displays, provide locally-stored data, provide local processing power, or provide access to local displays. For example, networks may provide communication paths and links to servers, which may host applications, content, and services that may be accessed or utilized by users via mobile user devices. The content may include text, video data, audio data, user settings or other types of data. Networks may use any suitable communication protocol or technology to facilitate communication between mobile user devices, such as, for example, BLUETOOTH, IEEE WI-FI (802.11a/b/g/n/ac), or Transmission Control Protocol/Internet Protocol (TCP/IP).

DESCRIPTION OF EXAMPLE EMBODIMENTS

Figure 1:
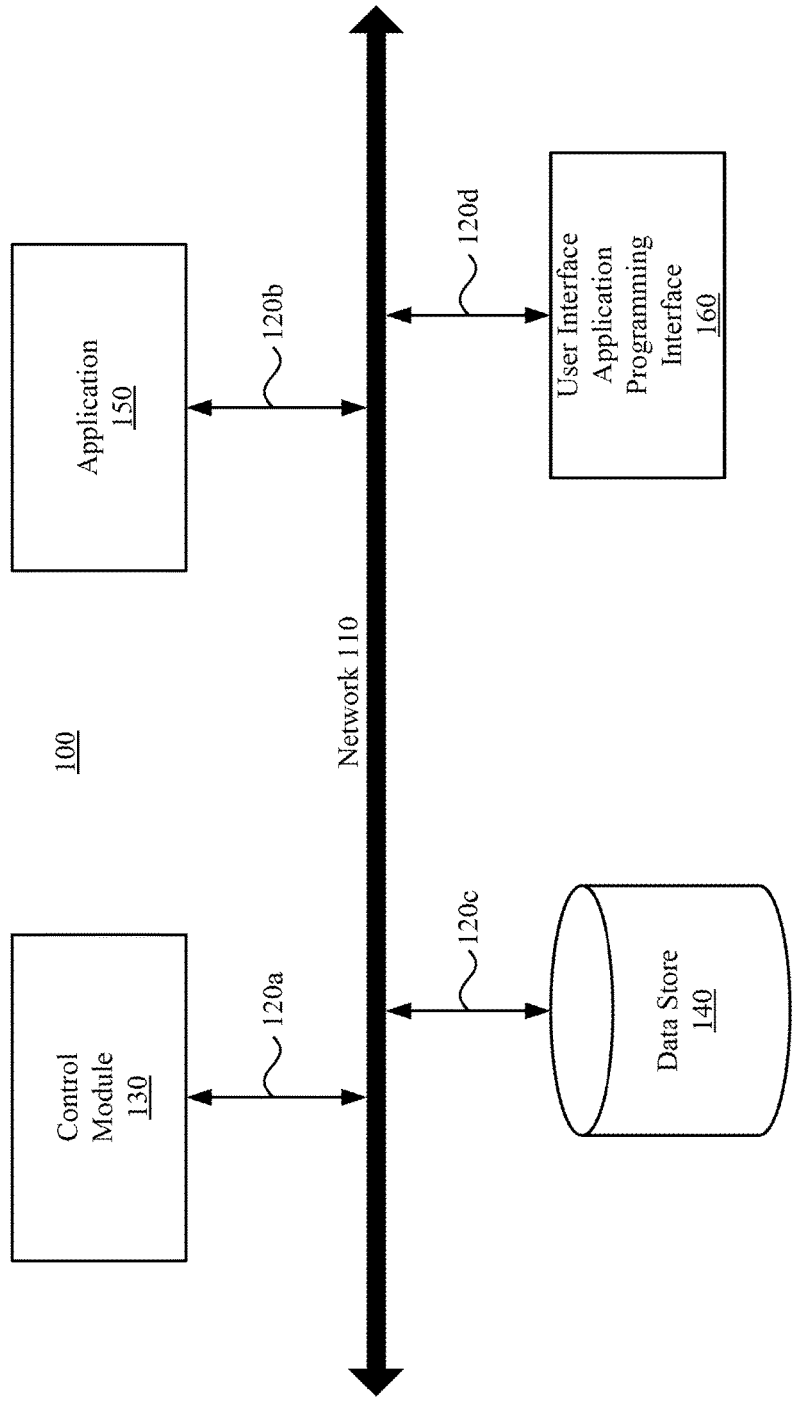
FIG. 1 illustrates an example network environment associated with a transient graphical object.

FIG. 1 illustrates an example network environment 100 associated with a transient graphical object. Although particular embodiments are described below in the context of user input in the form of gestures, this disclosure contemplates that alternative embodiments can utilize other types of user inputs (e.g., text-based input, voice-based input, etc.).

Network environment 100 may include control module 130, data store 140, application 150, and user interface (UI) application programming interface (API) 160 connected to each other by network 110. Although FIG. 1 illustrates a particular arrangement of control module 130, data store 140, application 150, and UI API 160, this disclosure contemplates any suitable arrangement of control module 130, data store 140, application 150, and UI API 160. As an example and not by way of limitation, two or more of control module 130, data store 140, application 150, and UI API 160 may be connected to each other directly, bypassing network 110. As another example, two or more of control module 130, data store 140, application 150, and UI API 160 may be physically or logically co-located with each other in whole or in part. For example, control module 130, data store 140, application 150, and UI API 160 may be co-located with each other within the same user device. Moreover, although FIG. 1 illustrates a particular number of control modules 130, data stores 140, applications 150, UI APIs 160, and networks 110 this disclosure contemplates any suitable number of control modules 130, data stores 140, applications 150, UI APIs 160, and networks 110. As an example and not by way of limitation, network environment 100 may include multiple control modules 130, data stores 140, applications 150, UI APIs 160, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 120a-d may connect control module 130, data store 140, application 150, and UI API 160 to communication network 110 or to each other. This disclosure contemplates any suitable links 120. In particular embodiments, one or more links 120 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 120 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 120, or a combination of two or more such links 120. Links 120 need not necessarily be the same throughout network environment 100. One or more first links 120 may differ in one or more respects from one or more second links 120.

In particular embodiments, data store 140 may include networked storage, as illustrated in FIG. 1, such as cloud storage or other network accessible storage. Additionally or alternatively, data store 140 may include local storage within or directly attached to control module 130, such as solid state drives ("SSDs") or hard disk drives ("HDDs"). In particular embodiments, data store 140 may store configuration data and view data cache. In some embodiments, configuration data may represent configurations of one or more transient graphical objects for application 150, as described below in greater detail. In some embodiments, view cache may include data for generating content objects or content elements within a transient graphical object for one or more applications. For example, the view cache may facilitate data access to content data when a user performs a gesture to open a transient graphical object. In some embodiments, a data storage interface may provide an interface between control module 130, application 150, UI API 160, and data store 140 to provide access to data.

In particular embodiments, components for generating a transient graphical object may be at various levels of the hardware and software architectures. In some embodiments, control module 130, data store 140, application 150, and UI API 160 correspond to one or more processors and instructions stored in data store 140 that are executable by the one or more processors. In some embodiments, at the software level, control module 130 may be deployed in a mobile device within the application layer, the operating system (OS) layer, or a combination of both. In some embodiments, application 150 may be deployed within the application level. In some embodiments, UI API 160 may be deployed within the OS layer. This disclosure contemplates that some or all of the functionalities of the components can be deployed in any other suitable way within the hardware or software layers.

In particular embodiments, control module 130 may include control logic to facilitate configuring, managing, and generating a transient graphical object. In some embodiments, application 150 is a software application installed on a user device and for which there is an associated icon that is displayed on the UI of the user device. In some embodiments, UI API 160 may provide an interface to receive user input data (e.g., user input corresponding to a touch gesture made on a touchscreen of the user device) and to control the graphical UI displayed on the user device and other output devices (speakers, vibration mechanisms, etc.).

In particular embodiments, control module 130 may be implemented using several approaches. In one embodiment, it may be written as an application that provides the "home screen" functionality for a device, such as a launcher application for the ANDROID operating system. This type of embodiment may allow control module 130 to provide transient graphical objects for applications when users gesture on their icons on a home screen, in a notification shade, or in the "application drawer." An alternate embodiment embeds the functionality of control module 130 directly into the underlying operating system, allowing it to provide transient graphical objects for applications wherever those applications are encountered (e.g., on a notification from an application in the notifications view).

In particular embodiments, control module 130 may recognize a request to generate a transient graphical object by utilizing gesture detection (or, e.g., user input detection) performed by the underlying operating system (e.g., taps, double-taps, long presses). Additionally or alternatively, control module 130 may implement its own gesture recognition. For example, UI API 160 may provide control module 130 with gesture data that control module 130 may process for gesture recognition. In some embodiments, gesture recognition may allow control module 130 to control the size of a transient graphical object based on continuous user input, recognize the start of a gesture, or recognize composite gestures dynamically in real time. Additionally or alternatively, control module 130 may be configured to receive discrete user input. For example, one gesture may initiate a transient graphical object and another gesture may remove the transient graphical object. Additionally or alternatively, control module 130 may provide the same functionality in response to other user input, such as voice data, stylus input, input from a separate input device, input generated from pressing a button, input from a sensor, or any other appropriate input. Although this disclosure discusses gesture recognition being performed by control module 130 or an operating system, this disclosure contemplates that gesture recognition may be performed by any suitable component.

In particular embodiments, control module 130 may generate the content of a transient graphical object in response to control module 130 receiving user input to create a transient graphical object. In some embodiments, the control module 130 may check whether application 150 provides custom content when generating a transient graphical object. Application 150 may indicate that it provides custom content through several mechanisms. As an example, application 150 may include a configuration data file (e.g., an XML file) that describes how it provides custom content. In this example, control module 130 may read the configuration file when application 150 is installed and store the configuration in the data storage device for later access, read the configuration file the first time it attempts to create a transient graphical object for application 150, or read the configuration file at any other suitable time. In some embodiments, when control module 130 reads a configuration file, it may store the configuration in data store 140 for later access. When receiving user input to create a transient graphical object, control module 130 may access stored configuration data to determine the custom content. In another example, application 150 may provide configuration data each time with the content rather than storing a configuration file. In another embodiment, application 150 may implement specific functionality (e.g., a background service or broadcast receiver) that responds to requests for custom content. In some embodiments, a configuration file includes data that allows control module 130 to determine custom content for the application. For example, the configuration file may contain custom content, or may indicate the location of custom content (e.g., a URL, folder, or other location that may contain custom content). In another embodiment, application 150 may notify control module 130 that application 150 provides custom content. Additionally or alternatively, control module 130 may generate the content of a transient graphical object in advance of user input to create the transient graphical object, which may be formatted, cached, or stored for access when needed.

In particular embodiments, in response to application 150 providing custom content, control module 130 may create a view for the custom content. In some embodiments, control module 130 may cache the most recent content for applications in the view cache, content for applications that have provided content custom content for some period of time, content that a user frequently accesses, content that a user may access soon (e.g., news content during a time of day when the user often checked news in the past), content for types of applications that the user has frequently accessed (e.g., communication applications, social applications, etc.), or control module may cache content in any other suitable manner. In some embodiments, control module 130 may provide an API for applications to periodically update their content, or control module 130 may show the last displayed content and request that applications refresh the content only when the user views that transient graphical object. In some embodiments, control module 130 may dynamically request content from the application every time the user opens a transient graphical object. In some embodiments, control module 130 may combine those approaches, e.g., by caching recent content but dynamically requesting content for applications whose transient graphical object the user has not viewed recently. In some embodiments, control module 130 may provide feedback to users indicating that control module 130 is waiting on content from the application (e.g., a spinner indicating that the invention is refreshing or requesting content). For example, control module 130 may make a request to UI API 160 to provide that indication.

In particular embodiments, control module 130 may display the same content for application 150 regardless of the current size of the transient graphical object. In particular embodiments, control module 130 may request or use different content from application 150 (e.g., overview, highlights, and details) or adjust the displayed content based on the size of the transient graphical object. For example, control module 130 may request content to fit different display sizes (e.g., small, medium, and large, or 100×100 pixels, 500×500 pixels, full screen, etc.). Control module 130 may then determine which content to display via UI API 160 based on the current size of the transient graphical object. In some embodiments, control model 130 may request that application 150 assign priorities to the content and then choose which content elements to show via UI API 160 based on the priorities assigned to elements, their size, and the available transient graphical object view size. In some embodiments, control module 130 may adjust the content before displaying it via UI API 130 using a set of built-in heuristics. As an example and not by way of limitation, control module 130 may use heuristics by shortening or hiding text fields, shrinking or hiding interface controls, adjusting text font sizes, or by making any other appropriate modification. As another example, heuristics may determine that newer content be prioritized for display over older content, that images be prioritized for display over text, or that content that includes a graphical control object be prioritized for display over content that does not include a graphical control object. In some embodiments, heuristics may determine content for a transient graphical object based on the size of the transient graphical object. For example, heuristics may prioritize image content for display for small transient graphical objects, prioritize adding text content as the transient graphical object expands, and prioritize adding content that includes a graphical control object as the transient graphical object approaches a final presentation.

In particular embodiments, application 150 may provide custom content in several forms. For example, application 150 may send to control module 130 a description of the UI content itself (e.g., the types, positions, styles, and contents of UI elements such as text fields and buttons), which control module 130 may use to create an appropriate transient graphical object through UI API 160. As another example, application 150 may send a description of the content (e.g., title; a list of items with icons, labels, and detailed descriptions; available actions the user can take, etc.) to control module 130, and control module 130 may use those descriptions to determine how to assemble the transient graphical object through UI API 160. In some embodiments, the two approaches of the examples above may be combined or any other suitable approach may be used.

Figure 2:
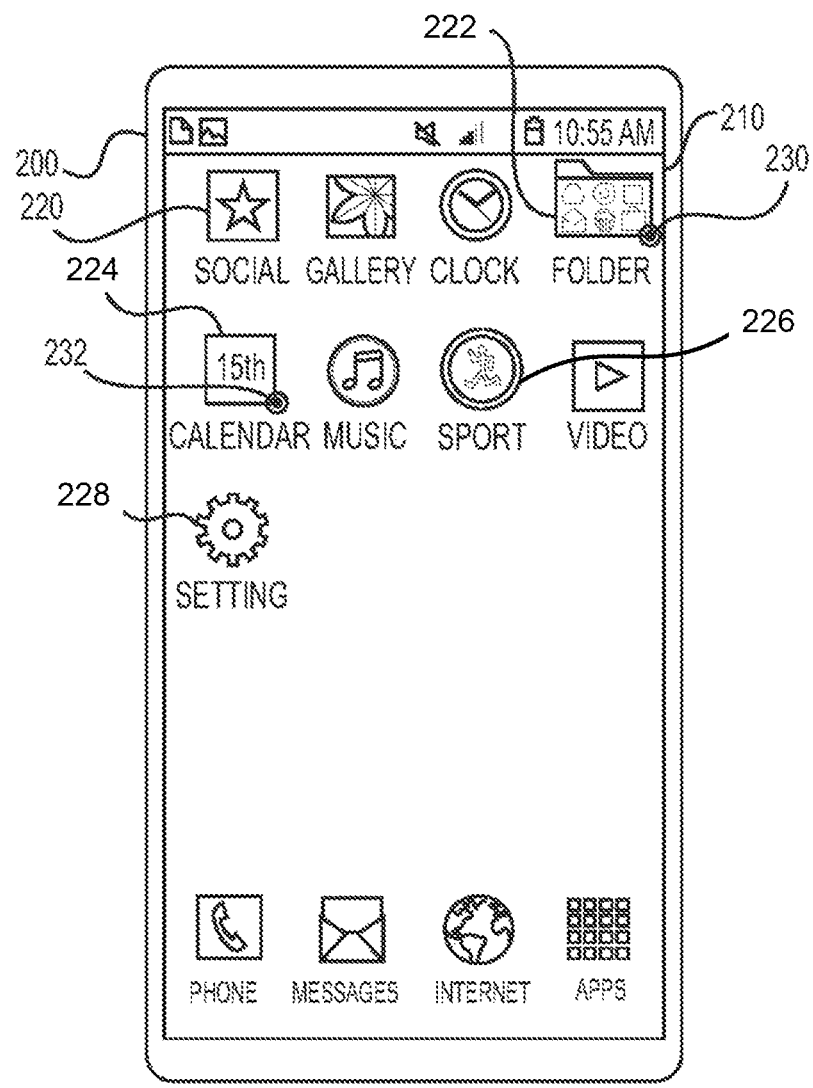
FIG. 2 illustrates an example display on an example user device.

FIG. 2 illustrates an example display 210 on an example user device 200. In particular embodiments, user device 200 includes one or more of control module 130, application 150, data store 140, and UI API 160 of FIG. 1. In some embodiments, display 210 may be a touchscreen display that may receive user input (e.g., gestures, stylus input, voice, etc.). In some embodiments, display 210 may not have touchscreen capabilities. In some embodiments, display 210 may be coupled to UI API 160 for receiving display data to render and for providing user input received by the touchscreen, if any. In particular embodiments, user device 200 may be a mobile device (e.g., a mobile phone, a tablet, a wearable computer device, etc.), a desktop computer, a laptop, or any other electronic device capable of providing a user interface.

In particular embodiments, display 210 may display one or more icons, such as icons 220-228. An icon may be a graphic linked to an application, a notification, a widget, a menu, a command, a file, etc. An icon may represent an application (e.g., the icon may provide a shortcut to an application) and allow a user to open an application by making an appropriate gesture (e.g., by tapping the icon). The application may correspond to application 150 of FIG. 1. An icon may also be informational, such as an icon representing information that the user has missed a call, received an email, or the like.

In particular embodiments, control module 130 may render one or more visual indicators, such as visual indicators 230 and 232. Visual indicators may indicate which applications have content for display in a transient graphical object. For example, visual indicators may be rendered on or near icons associated with applications that have content for display in a transient graphical object. As another example, visual indicators may be rendered on or near icons associated with applications that do not have content for display in a transient graphical object. In some embodiments, visual indicators may provide information about available content. For example, a visual indicator's size, color, location, or other property may vary depending on amount of content, type of content, or importance of content. Additionally or alternatively, visual indicators may provide information about whether an application provides custom content for a transient graphical object. In particular embodiments, visual indicators may be rendered dynamically based on different conditions. As an example and not by way of limitation, visual indicators may be rendered when a user taps an icon on display 210, when a user rearranges icons on display 210, or any other appropriate condition. In particular embodiments, visual indicator may identify whether an application supports presentation of a transient graphical objects, even when no particular transient graphical object is available at that moment.

In particular embodiments, one or more icons may represent a plurality of applications. For example, an icon may be a folder that contains multiple applications, such as icon 222. In some embodiments, a user may configure a folder by choosing which applications are in the folder. Additionally or alternatively, control module 130 may render a transient graphical object for a plurality of icons in response to user input (e.g., a particular gesture) that indicates which applications are to be associated with the transient graphical object. In some embodiments, content for a transient graphical object associated with a plurality of applications may be aggregated. As an example, icon 222 may represent a folder containing multiple icons representative of multiple applications. In this example, a transient graphical object may be rendered for icon 222 that uses content associated with the multiple applications. In some embodiments, control module 130 may synthesize content for the transient graphical object based on content drawn from multiple applications.

As an example and not by way of limitation, control module 130 may synthesize content to be included in a transient graphical object associated with a folder containing the FACEBOOK, TWITTER, INSTAGRAM, and SNAPCHAT applications by summarizing status updates from the FACEBOOK application, posts from the TWITTER application, and photos from the INSTAGRAM application. In some embodiments, a user may configure which content is displayed or a user may specify applications whose content will be displayed. In some embodiments, control module 130 may automatically select content among the content available for the multiple applications to display for a transient graphical object associated with icon 222. As an example and not by way of limitation, control module 130 may automatically select content among content available for multiple applications by selecting content associated with applications that the user frequently used, by prioritizing a category of content based on historical user interactions (e.g., by selecting content associated with messages for a user that has frequently sent and received messages), by selecting newer content over older content, or by automatically selecting content in any other appropriate manner.

Figure 3A:
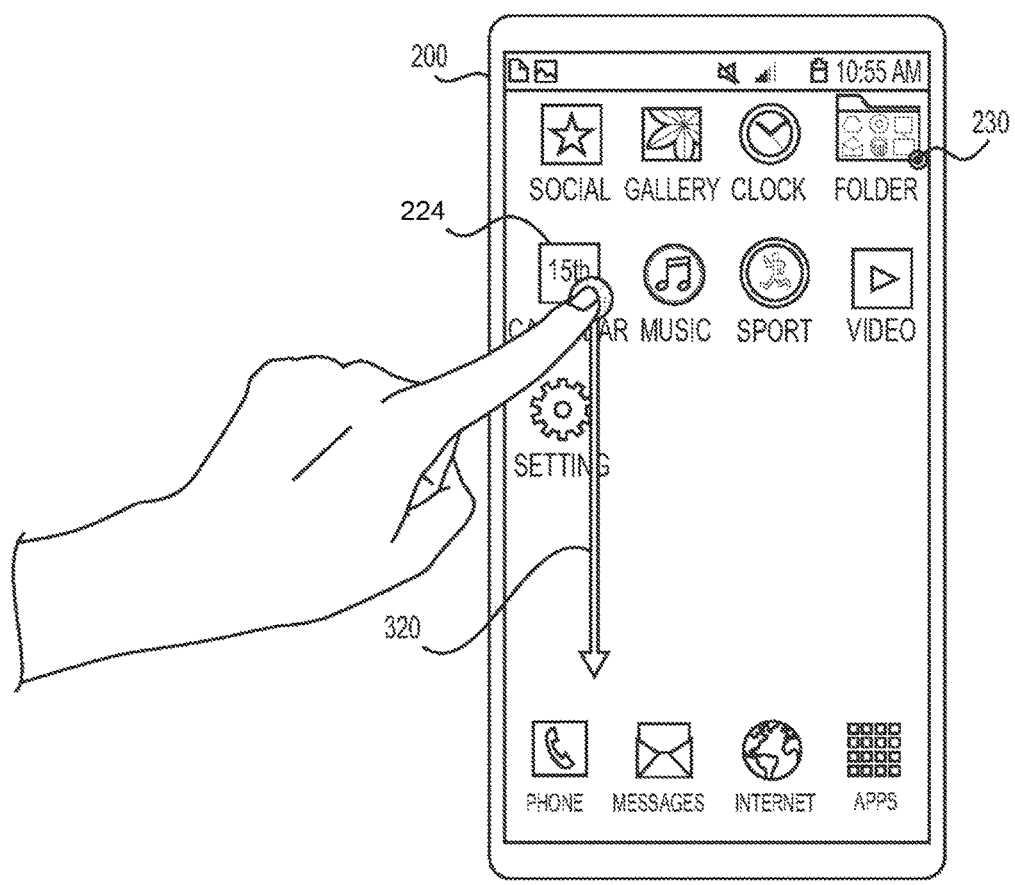
FIGS. 3A-C illustrate an example transient graphical object.
Figure 3B:
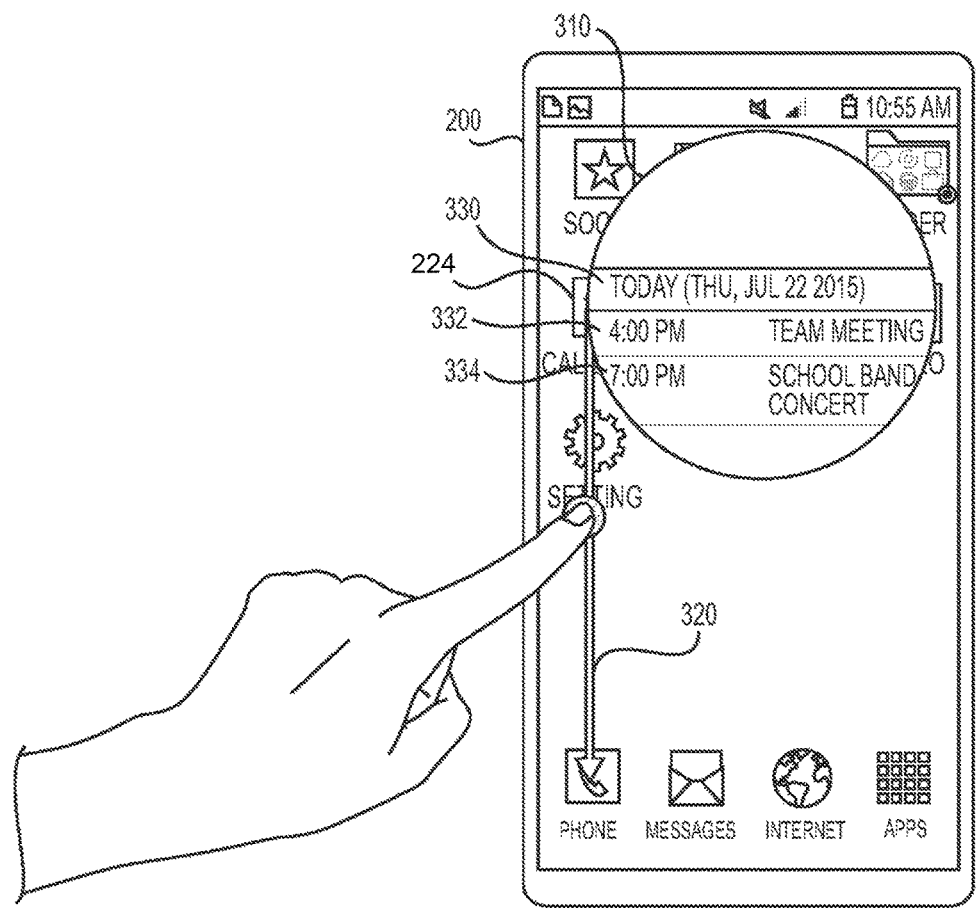
Figure 3C:
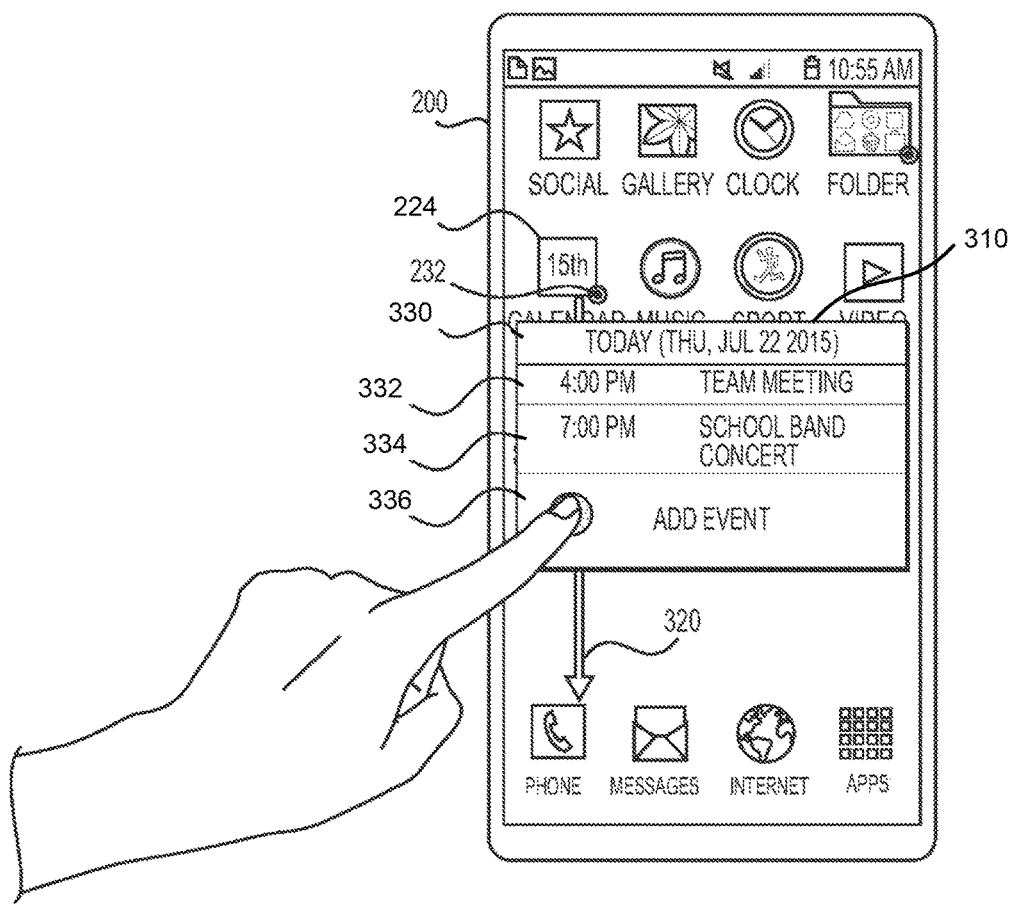

FIGS. 3A-C illustrate an example user device 200 providing transient graphical object 310. In particular embodiments, user device 200 may generate transient graphical object 310 (shown in FIGS. 3B-C) in response to receiving user input. For example, a user may provide user input including touch gesture 320 performed on display 210 of user device 200. In some embodiments, a user may initiate transient graphical object 310 associated with a particular application by beginning a gesture at an icon that represents the application. FIGS. 3A-C illustrate a particular gesture 320 that originates at icon 224, which represents a calendar application. Although FIGS. 3A-C illustrate a particular user interaction in the form of gesture 320, a particular icon 224 associated with a calendar application, and a particular transient graphical object 310, this disclosure contemplates any suitable user interaction, any suitable icon, any suitable application, and any suitable transient graphical object. For example, a user interaction may be by voice, detected by a microphone of user device 200. As another example, icon 224 need not represent a shortcut to an application, but may represent a notification, a file, or by any other type of icon.

FIG. 3A represents the beginning stage or transition stage of rendering transient graphical object 310. In this example, a user's gesture 320 begins at icon 224 and continues along the path of the arrow. Although the example gesture 320 is depicted as a downward swipe, this disclosure contemplates any suitable gesture. As an example and not by way of limitation, a gesture may include a linear swipe in a particular directions, a rotational (e.g., spiraling) swipe, a tap, a double tap, a long press, a scroll, a pan, a flick, a two finger tap, a two finger scroll, a pinch, a two finger rotation, or any other suitable gesture. For example, a rotational swipe may control the size of the transient graphical object 310 and the category of content that is displayed based on its polar coordinates with respect to the icon. In an example embodiment, the radial distance of the gesture position from the icon can control the size (e.g., greater radial distance generates a larger sized transient graphical object) and the angular distance of the gesture position with respect to the icon can select the virtual space of the transient graphical object.

In some embodiments, a gesture may be a composite gesture (e.g., the gesture may include at least a first portion and a second portion). Each portion of a composite gesture may represent different functionality. In some embodiments, each portion of a composite gesture may be detected based on the direction of a gesture. As an example, a composite gesture may include swiping downward from icon 224 and then swiping back up toward icon 224 without a break in contact with display 210. In this example, in response to a swiping downward gesture at icon 224, control module 130 may initiate transient graphical object 310 associated with icon 224. In response to the gesture continuing downward, control module 130 may expand transient graphical object 310, as illustrated in FIG. 3B-C. In response to swiping back up, control module 130 may reduce the size of transient graphical object 310, and ultimately remove transient graphical object 310 in response to the user's finger returning to icon 224. Although this is a particular example of a composite gesture, many possible composite gestures are possible. For example, a composite gesture may include a user swiping and then lifting their finger from the display, which may have the associated functionalities of initiating transient graphical object 310 and removing transient graphical object 310 for the respective portions. This disclosure contemplates any suitable composite gesture.

In particular embodiments, a user may perform a gesture to initiate a transient graphical object. As an example, such a gesture may include a swipe originating at an icon, double tapping an icon, performing a long press on an icon, or any other appropriate gesture. In some embodiments, transient graphical object 310 may be rendered in a discrete manner in response to a gesture (e.g., the final presentation of the transient graphical object may be rendered in response to the gesture). In some embodiments, control module 130 may continuously render transient graphical object 310 in response to a gesture (e.g., control module 130 may expand transient graphical object 310 as the gesture continues until the final presentation of the transient graphical object is rendered). For example, FIG. 3B illustrates an intermediate stage of a continuously rendered transient graphical object 310. In FIG. 3A, a user has performed a gesture to initiate transient graphical object 310, and as the user swipes downward with gesture 320, transient graphical object 310 expands, as in FIG. 3B, until reaching the final rendering of transient graphical object 310 in FIG. 3C, where the final presentation of transient graphical object 310 is reached. In embodiments with a continuously rendered transient graphical object 310, the transition from initiation to the final presentation may take the form of an expanding window (as illustrated in FIG. 3B), or any other appropriate form. Although control module 130 is described as performing certain functions, this disclosure contemplates that any other suitable component may perform such functions.

The final presentation of transient graphical object 310 may be presented in a number of different forms. In particular embodiments, the final presentation may involve control module 130 rendering transient graphical object 310 in a full screen view that hides other content, as a transparent overlay over the initial screen, as an object that appears over part of the initial screen, as an underlay on the initial screen, or in any other suitable form. In particular embodiments, control module 130 may render transient graphical object 310 by transforming the associated icon (e.g., by increasing the boundaries of the icon, modifying the visual presentation of the icon, displaying content within the icon, etc.). In some embodiments, control module 130 may configure the form of the final presentation in response to user input by using, for example, a UI associated with control module 130. Although control module 130 is described as performing certain functions, this disclosure contemplates that any other suitable component may perform such functions.

In particular embodiments, transient graphical object 310 may include content objects, such as content objects 330-336 (as shown in FIGS. 3B and 3C). Each content object may include content elements from one or more sources. In some embodiments, a content object may include content elements that are associated with a particular event, widget, notification, or any other type of information. As an example, content object may include contents elements associated with an appointment on a calendar application, such as content elements representing the name of the appointment or the time of the appointment.

In particular embodiments, content elements may include content based on data from the application associated with the transient graphical object. As described above, an application may provide custom content (e.g., via providing a configuration file or a background service that includes or locates custom content). As an example, the calendar application associated with icon 224 may provide custom content. The custom content may include the current date and the name, time, or date of appointments in the calendar. Control module 130 may use the custom content to display content objects, (e.g., content objects may include content elements derived from the custom content).

In particular embodiments, content elements may include content from online data (e.g., data from an online database, a web API, etc.). For example, a content object 332 may include content elements containing content from a calendar application, including an appointment name "team meeting" and a scheduled time for 4:00 pm. The calendar application may also provide a location for the appointment as custom content available to control module 130. Control module 130 may also receive location data from a GPS sensor on user device 200 which indicates the location of the user. Control module 130 may then receive online data (e.g., in response to a query to an online database or a web API) to determine traffic conditions between the user's location and the appointment location and display a content element that indicates an estimated time that it would take a user to go from the user's current location to the appointment location. As in this example, content objects in particular embodiments of the invention may contain content elements derived from multiple sources. In this example, a content object associated with the team meeting event may contain content elements derived from data from the application (e.g., the name and time of the appointment), system-level data (e.g., the user's location) and online data (e.g., an estimated time of arrival).

In particular embodiments, a content object of transient graphical object 310 may include a graphical control object. A graphical control object may correspond to a UI object that is selectable by the user and is configured to initiate an action in response to being selected. Examples of graphical control objects include menus, icons, graphical control elements, tabs, graphical buttons, graphical dials, graphical sliders, textbox, hypertext, and other software components that can receive user input and facilitate interactions by the user. In some embodiments, an action linked to a graphical control object may be particular to the application associated with transient graphical object 310 or to the content object associated with the graphical control object. For example, transient graphical object 310 may be associated with a calendar application, as in FIG. 3C. In this example, content object 336 may include a button labeled "add event" that when pressed, allows a user to add an event in the calendar application. As another example, a transient graphical object related to a music application may include content objects associated with different songs. In this example, each of the content objects may include a graphical control object particular to the associated content object, such as a button that plays the song associated with the content object when pressed. Although FIG. 3C illustrates a particular graphical control object, this disclosure contemplates any suitable graphical control object for use as a content object. In some embodiments, a graphical control object may initiate an action by opening the application associated with transient graphical object 310. Additionally or alternatively, a graphical control object may initiate an action without opening an application.

In particular embodiments, control module 130 may select content objects for display in transient graphical object 310 based on control logic (e.g., a set of rules or logic applied to determine which content objects to display or which content elements within a content object to display). As an example, control logic stored in data store 140 and accessed by control module 130 may determine that when control module 130 is rendering a transient graphical object for an application, control module 130 first determines if the application provides custom content (e.g., via accessing configuration data associated with the application) and, if so, displays content objects derived from the custom content. In this example, if the application does not display custom data, control module 130 may display other content objects relevant to the application, such as a widget associated with the application or relevant information derived from system-level data. In some embodiments, if no content is available for display in transient graphical object 310, control module 130 may provide feedback to a user (e.g., by causing user device 200 to vibrate, by displaying an error message, by shaking the application icon, etc.).

In particular embodiments, control module 130 may use control logic to render transient graphical object 310 based on the context of user device 200. For example, if the battery of user device 200 is low, control module 130 may render transient graphical object 310 with a content object representing the relative battery consumption of the application or an estimation of how long the user can interact with the application given the current charge of the battery of user devices 200. As an another example, if BLUETOOTH audio devices are available or connected to user device 200, control module 130 may render transient graphical object 310 with graphical control objects representing controls for interacting with those devices if transient graphical object 310 is associated with an audio-focused application (e.g., music players, podcast applications). As another example, control module 130 may increase the size of text or content objects, reduce the number of displayed content objects, or any other appropriate alteration when user device 200 is in motion.

In particular embodiments, content objects may be user-configurable. In some embodiments, a user may configure the content of a transient graphical object by specifying the content objects or content elements of a content object that the transient graphical object displays. In embodiments that include a content policy, one example content policy may include first determining if a user has configured content for a transient graphical object and may display the user-configured content if it exists. In some embodiments, a user may configure content objects via an application, a UI, a menu, by gesturing, or by any other suitable means.

Figures 4A, 4B:
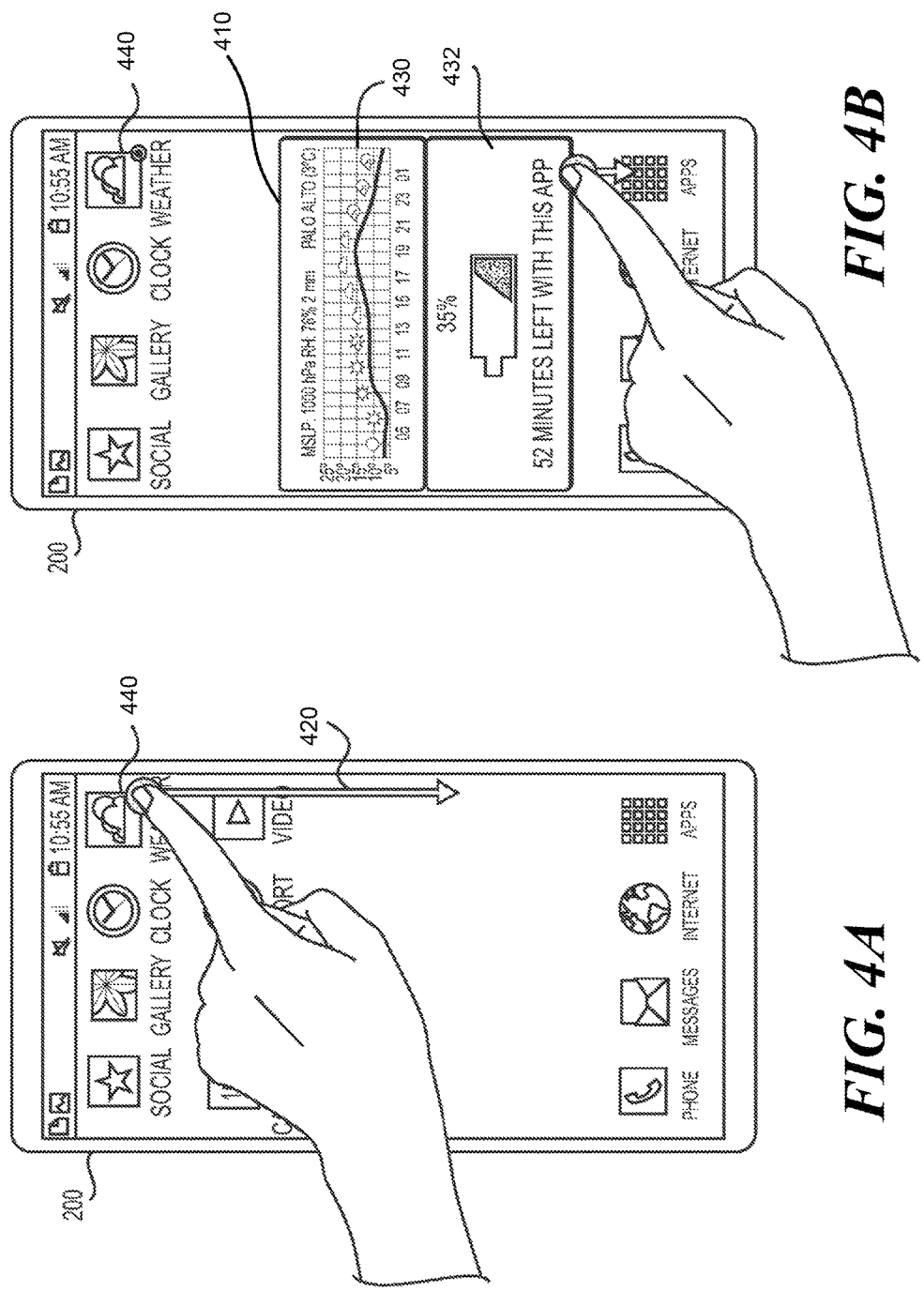
FIGS. 4A-B illustrate example content objects of a transient graphical object.

FIGS. 4A-B illustrate example content objects of a transient graphical object. In some embodiments, a content object may include a widget, such as the widget in content object 430. A widget may be an icon-based UI that allows a user to interact with an associated application. A widget may dynamically render updated information associated with an application or provide a user the ability to input data for use by an associated application. In some embodiments, an application may include one or more widgets that are associated with the application. In some embodiments, transient graphical object 410 may render a widget for the application associated with transient graphical object 410 as a content element of a content object. For example, icon 440 may be associated with a weather application. The weather application may also include the widget in content object 430 that is configured to display a graphical representation of predicted weather for a day. In this example, transient graphical object 410 may display the widget in content object 430 as a content element.

In particular embodiments, content elements may include content based on system-level data. As an example, the weather application associated with icon 440 may be running on user device 200, which may be running the ANDROID operating system. The ANDROID operating system may send to control module 130 information about the weather application, such as the battery usage or network usage. A content object may include a content element that represents this information. For example, a content element in content object 432 may indicate how long the weather application can run given the current state of the battery, the percentage of the charge of the battery, the percentage of the network resources that the weather application has used, or other such information. In some embodiments, system-level data may include data received from an operating system, data from a sensor of user device 200, data that is shared with or common to multiple applications, or similar collections of data.

FIGS. 5A-D illustrate an example transient graphical object 510 rendered dynamically based on its size. As described above, transient graphical object 510 may be rendered continuously in response to gesture 520. For example, transient graphical object 510 may expand as the user's gesture moves away from the part of display 210 that gesture 520 originated from (in this case, icon 226) and become smaller as the gesture moves in the opposite direction. This may allow a user to view part of transient graphical object 510 without displaying the final rendering of transient graphical object 510. In some embodiments, the content displayed by a transient graphical object may stay the same even as the transient graphical object changes size.

Figure 5A:
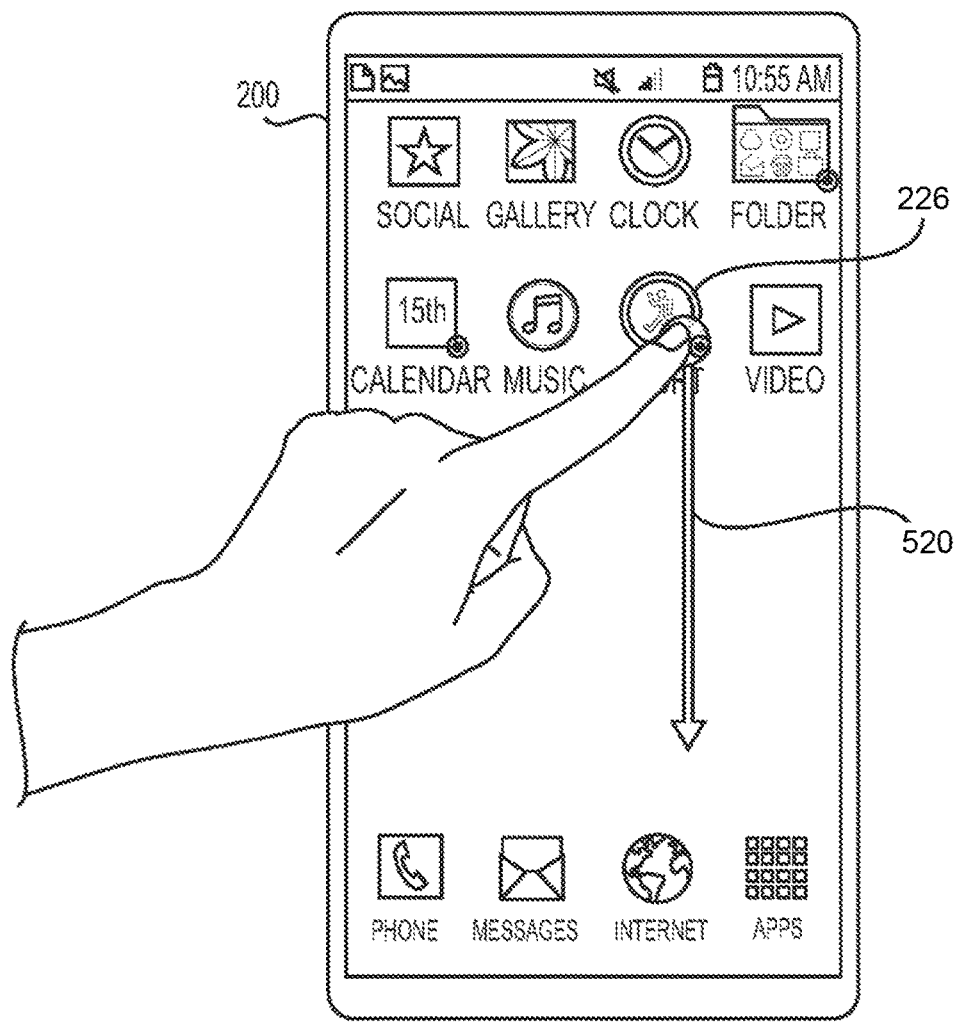
FIGS. 5A-D illustrate an example of a transient graphical object rendered dynamically based on its size.
Figure 5B:
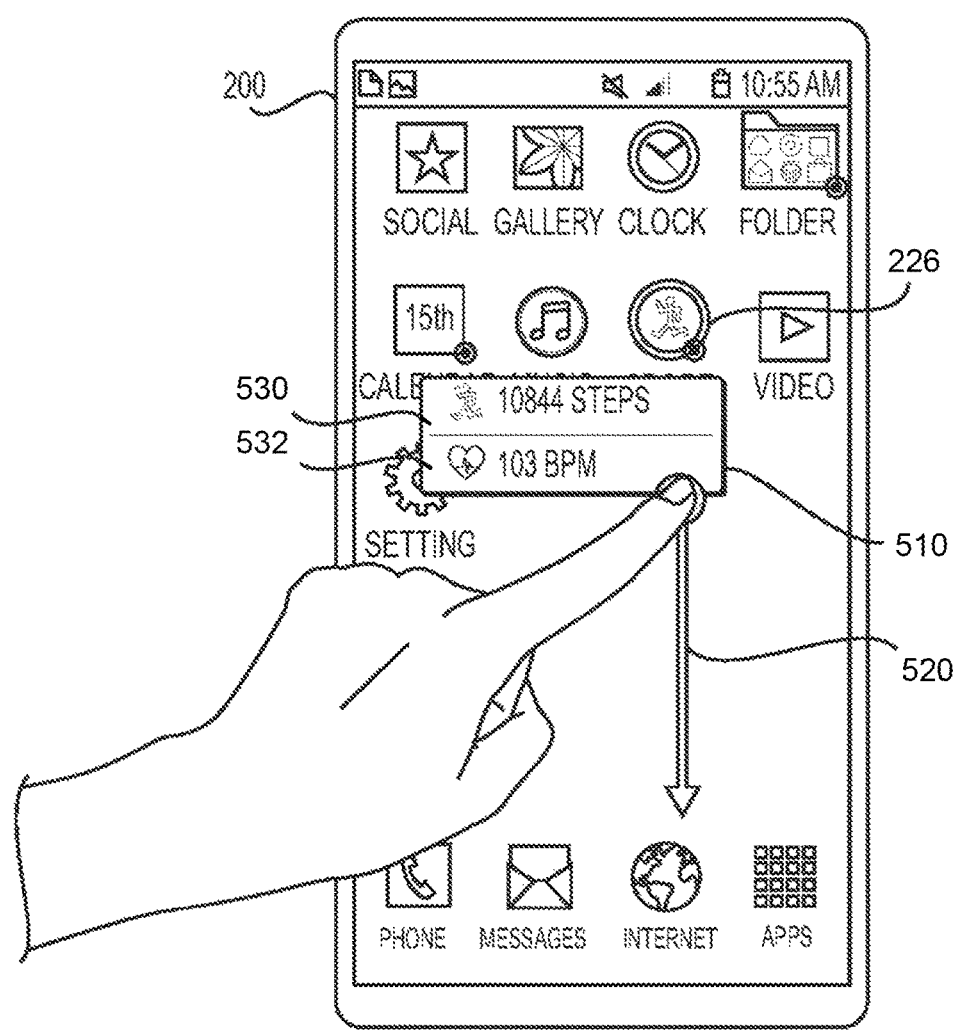
Figure 5C:
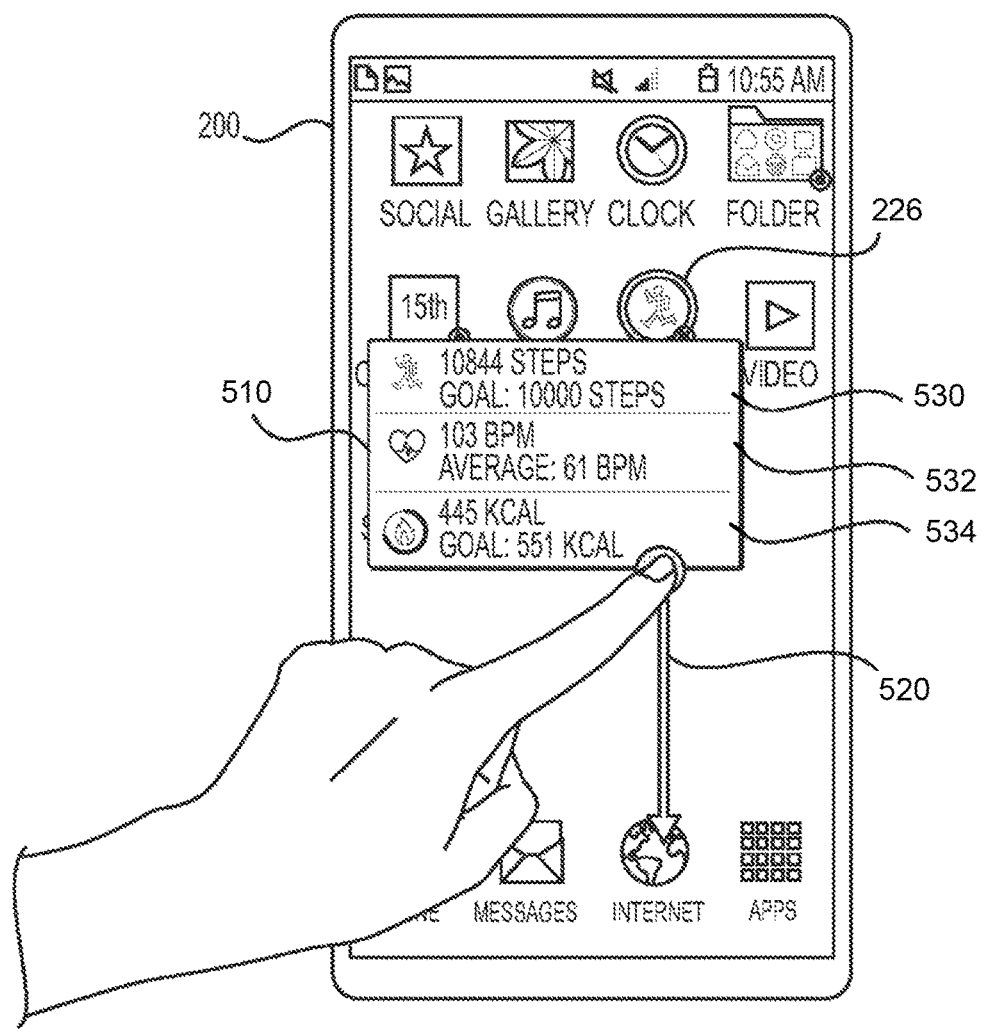
Figure 5D:
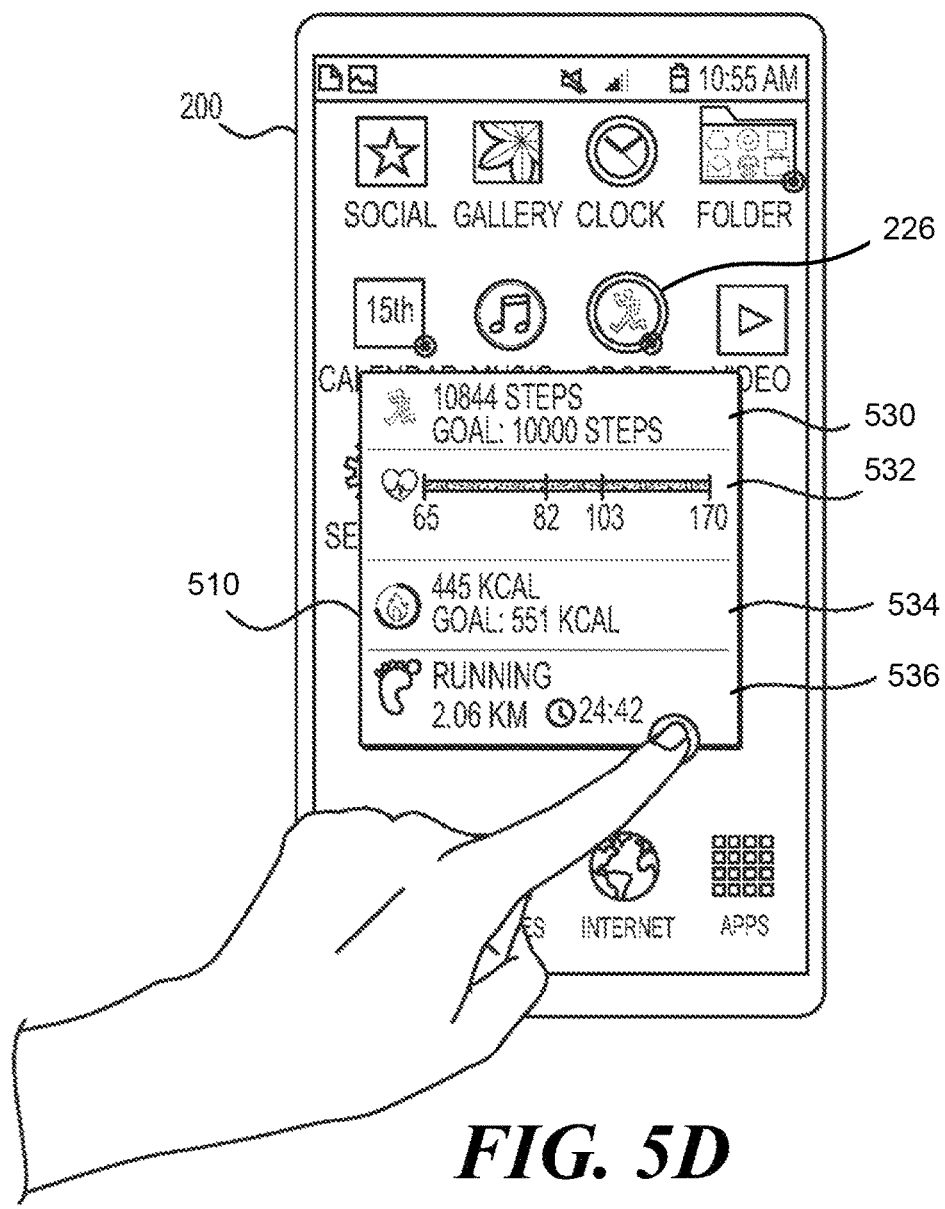

In particular embodiments, content elements of content objects may be rendered based on the size of transient graphical object 510. In some embodiments, control module 130 may generate more content objects, such as content objects 530-536, or more content elements for content objects as transient graphical object 510 expands, and may remove content objects or content elements as transient graphical object 510 becomes smaller. As an example, FIGS. 5B-D illustrates transient graphical object 510 (initiated in FIG. 5A) at increasing sizes based on gesture 520. In this example, transient graphical object 510 may be associated with a health application (e.g., an application that tracks a user's step count, heart rate, burned calories, time or distance spent running, etc.) represented by icon 226. In FIG. 5B, transient graphical object 510 is comparatively small, and two content objects, content objects 530 and 532, are displayed representing the user's step count and the user's heart rate in beats per minute (BPM).

FIG. 5C illustrates the expansion of transient graphical object 510 from FIG. 5B based on the user's continuation of gesture 520. Compared to FIG. 5B, transient graphical object 510 in FIG. 5C has one additional content object 534 that represents an amount of calories burned and a goal amount of calories burned. Additionally, content objects 530 and 532 have an additional content element in FIG. 5C compared to FIG. 5B. In this example, content object 530 representing step count displays a content element representing a goal number of steps in addition to a content element representing a current number of steps. Similarly, content object 532 representing heart rate displays an additional content element representing an average heart rate.

FIG. 5D represents the expansion of transient graphical object 510 from FIG. 5C as gesture 520 continues. As with the transition from FIG. 5B to FIG. 5C, transient graphical object 510 in FIG. 5D has an additional content object 536, which represents a distance and time the user spent running. Additionally, the content elements of content object 532 representing the user's heart rate have changed to a graph that depicts the users minimum, average, current, and maximum heart rate. Although FIGS. 5A-D illustrate an expanding transient graphical object, this disclosure contemplates that a transient graphical object may become smaller in response to user input and that the number or type of content objects or content elements with a content object of a transient graphical object may change as the transient graphical object becomes smaller.

In particular embodiments, a configuration data file for an application associated with transient graphical object 510 may determine how content objects or content elements change, are added, or are removed based on the size of transient graphical object 510. Additionally or alternatively, control module 130 may use control logic to determine for specific applications or for applications in general how content objects or content elements change, are added, or are removed based on the size of transient graphical object 510. Additionally or alternatively, user input may determine how content objects or content elements change, are added, or are removed based on the size of transient graphical object 510.

Although FIGS. 5A-D illustrate a particular example transient graphical object 510 rendered dynamically based on its size, there are many such examples. As another example, a transient graphical object may be associated with a phone application. In this example, when the transient graphical object for the phone application is small, it may show a content object associated with missed calls including a content element representing the number of missed calls. As the user expands the transient graphical object, the transient graphical object may further include content objects representing missed calls with content elements including the identity of the callers (e.g., names and/or numbers). When the user expands the transient graphical object even further, the content objects representing missed calls may further include graphical control object buttons to return each of the missed calls. Further expansion may add graphical control objects representing controls to initiate calls to the user's frequent or favorite contents.

In particular embodiments, the size of transient graphical object 510 may determine the balance between application provided data and system-level data. For example, the transient graphical object might only include meta-data about the application (e.g., its bandwidth, battery use, controls for adjusting the glimpse) when the transient graphical object is fully expanded. As an additional example, the transient graphical object may not include a graphical control object for accessing the application when the transient graphical object is smaller (e.g., when users can access the application directly because the application icon is rendered on the display), but may include a graphical control object for accessing the application for the final rendering of the transient graphical object if the application icon is occluded.

FIGS. 6A-D and FIGS. 7A-D illustrate examples of a transient graphical object associated with a health application represented by icon 226 rendered based on the direction of a gesture. In particular embodiments, the path or type of a gesture may modify the number or type of content objects or the number or type of content elements in a content object in a particular manner. In particular embodiments, the direction or type of gesture determines whether, as a transient graphical object expands, additional content objects are rendered or whether additional content elements for preexisting content objects are rendered. In the example of FIGS. 6A-D and FIGS. 7A-D, vertical gesture 620 functions to expand a transient graphical object by adding more content objects and horizontal gesture 720 functions to expand a transient graphical object by adding additional content elements to existing content objects.

Figure 6A:
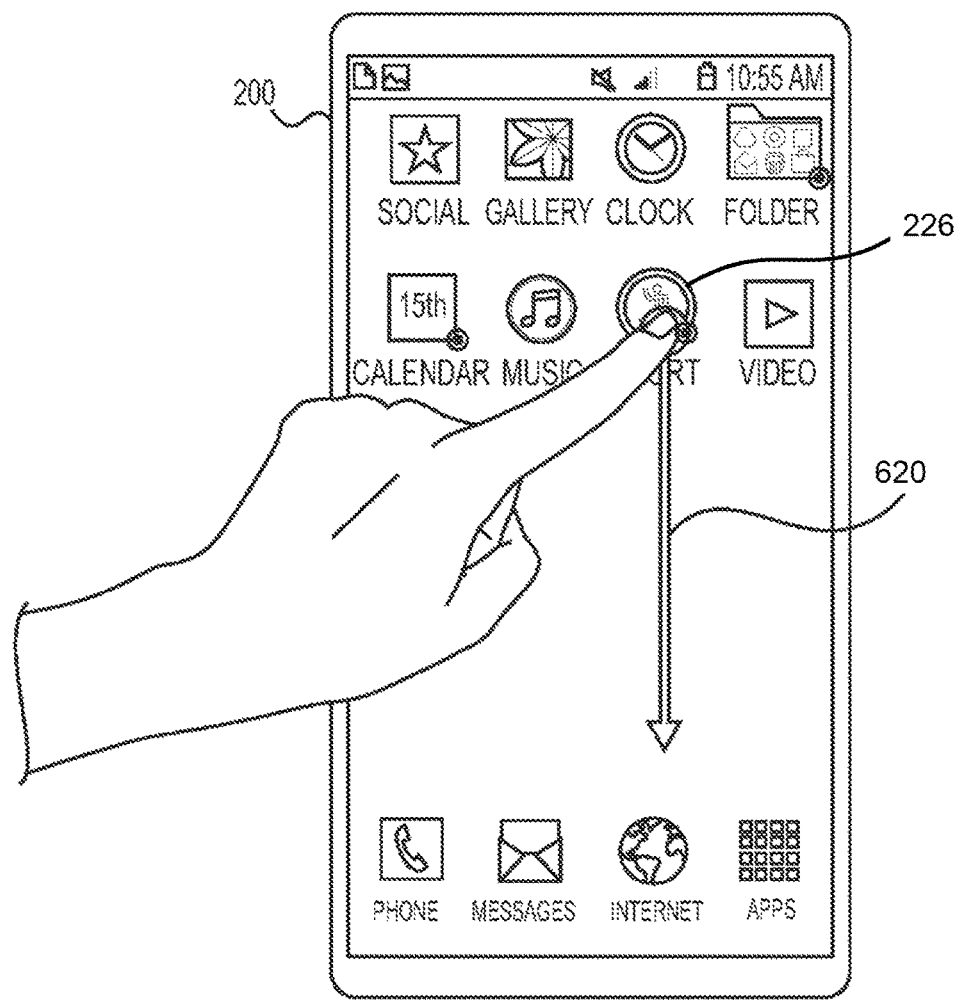
FIGS. 6A-D illustrate an example of a transient graphical object rendered based on the direction of a gesture.
Figure 6B:
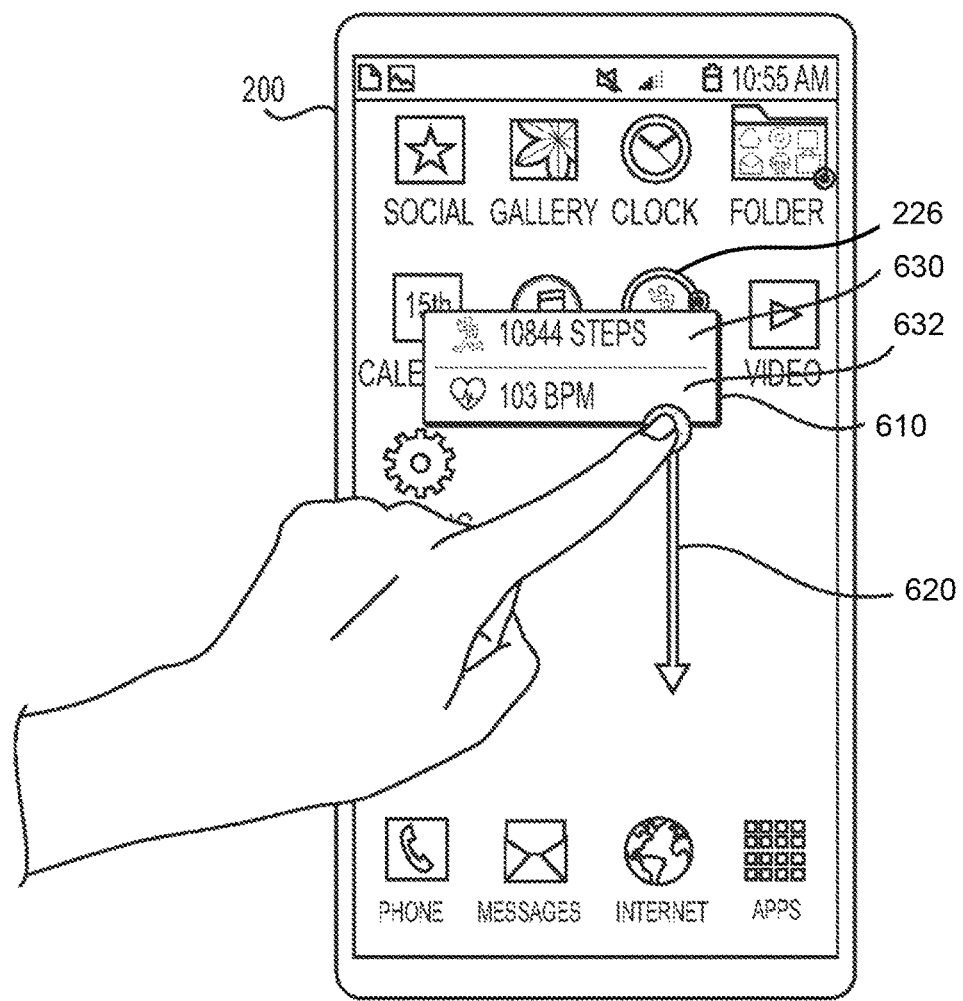
Figure 6C:
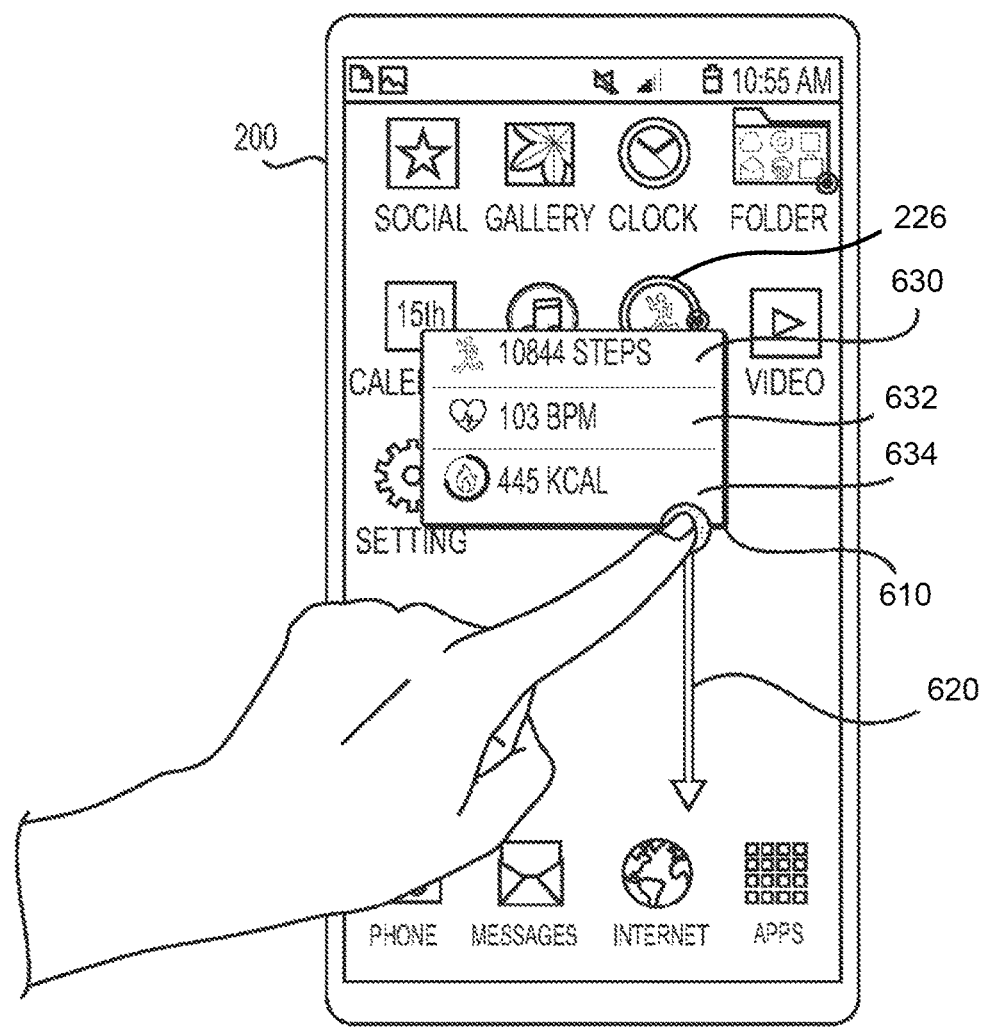
Figure 6D:
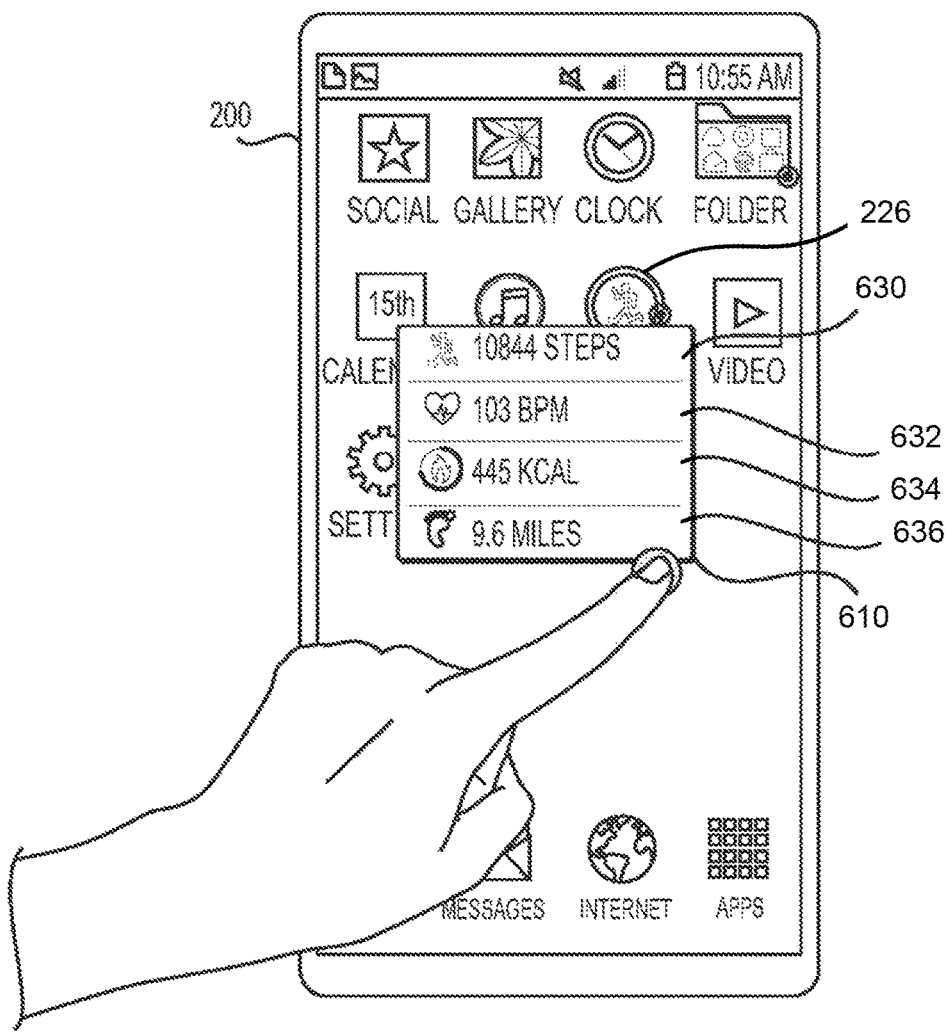

FIGS. 6A-D illustrate a user performing vertical gesture 620, which functions to expand transient graphical object 610 by adding content objects 630. Transient graphical object 610 is rendered in its smallest form in FIG. 6B. In FIG. 6B, transient graphical object 610 includes two content objects 630 and 632 representing the user's step count and the user's heart rate in BPM respectively. As the user's gesture continues in FIGS. 6C and 6D, transient graphical object 610 expands by adding content objects 634 and 636. For example, in FIG. 6C, transient graphical object 610 renders a new content object 634 representing the calories burned by the user and in FIG. 6D, transient graphical object 610 expands by adding a new content object 636 representing a distance and time spent running.

Figure 7A:
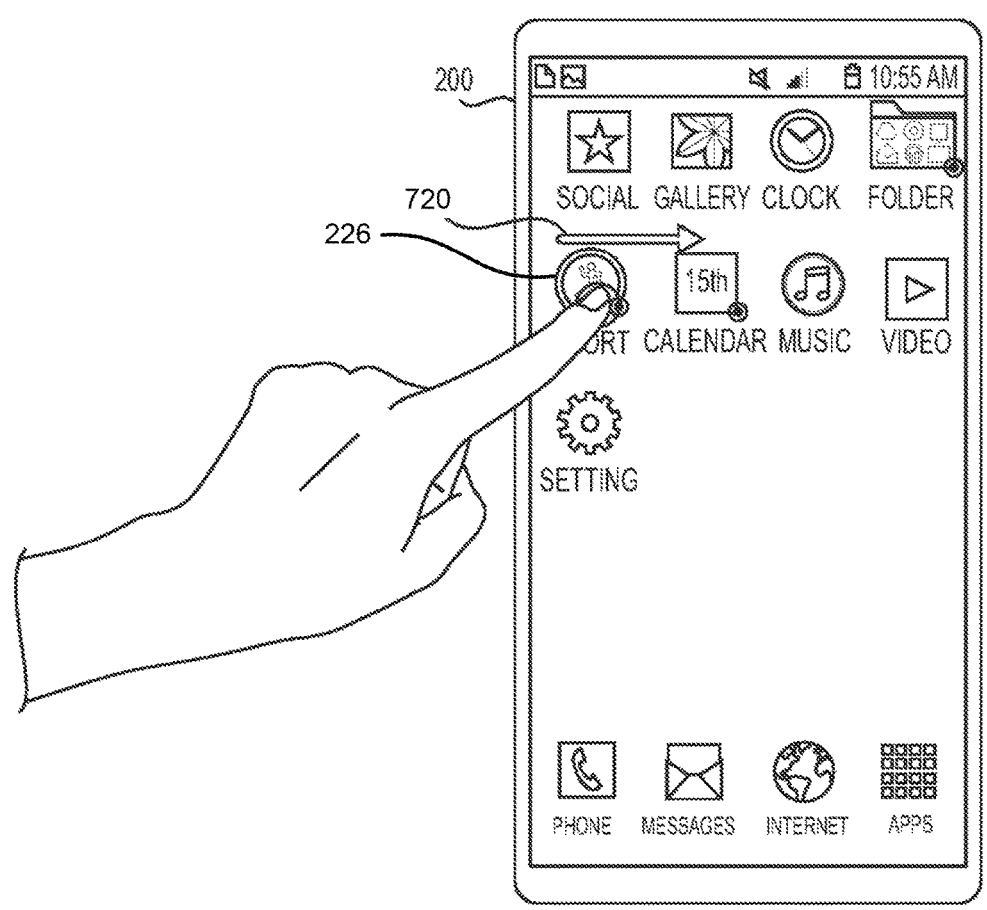
FIGS. 7A-D illustrates an example of a transient graphical object rendered based on the direction of a gesture.
Figure 7B:
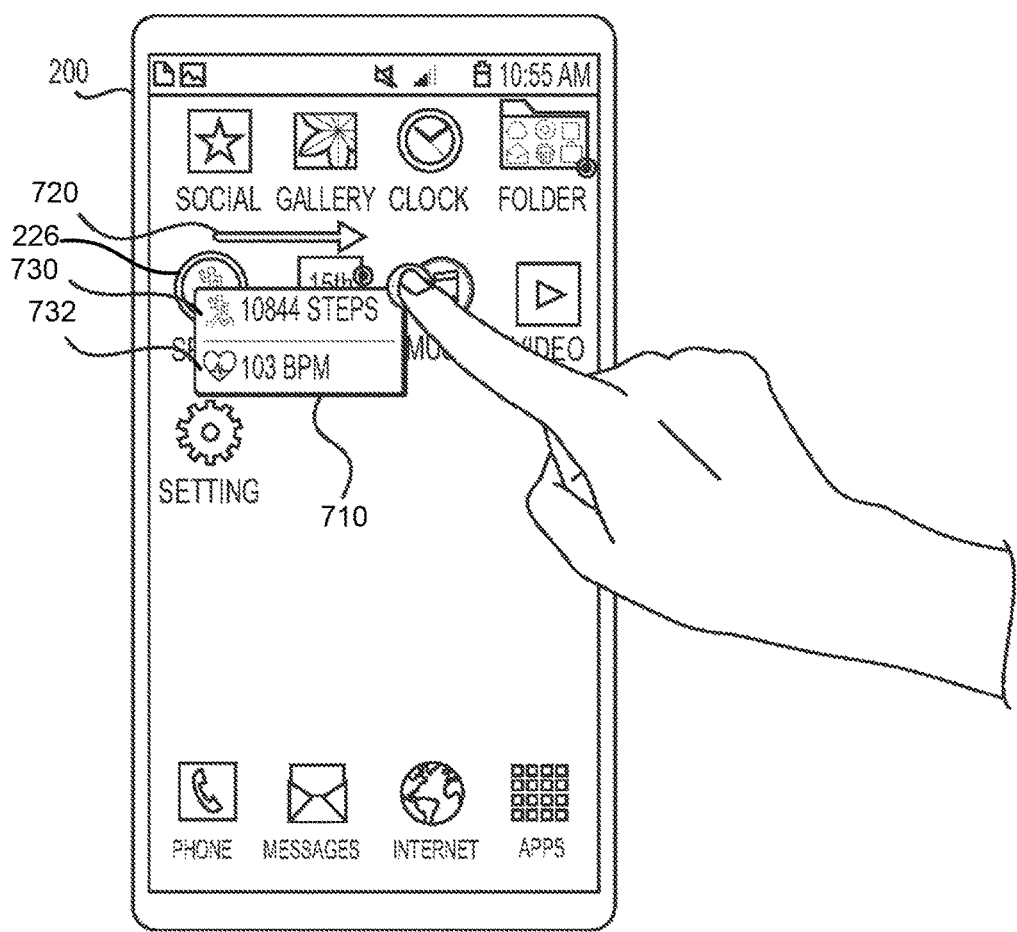
Figure 7C:
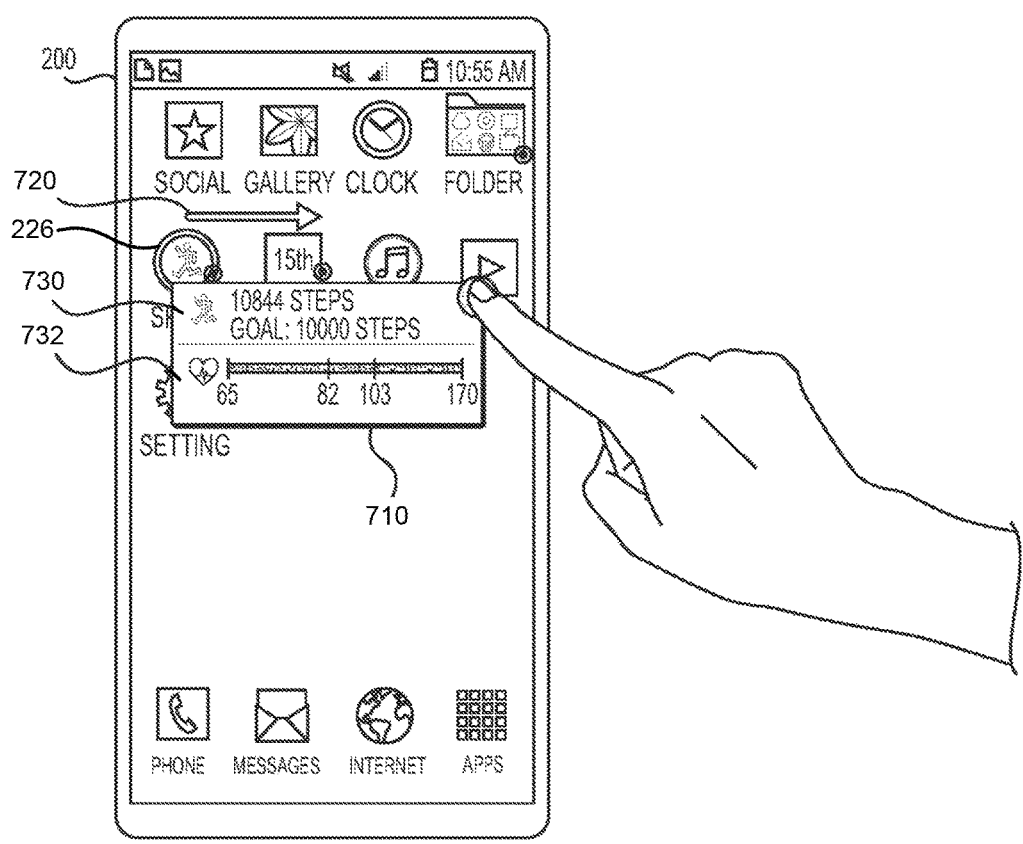
Figure 7D:
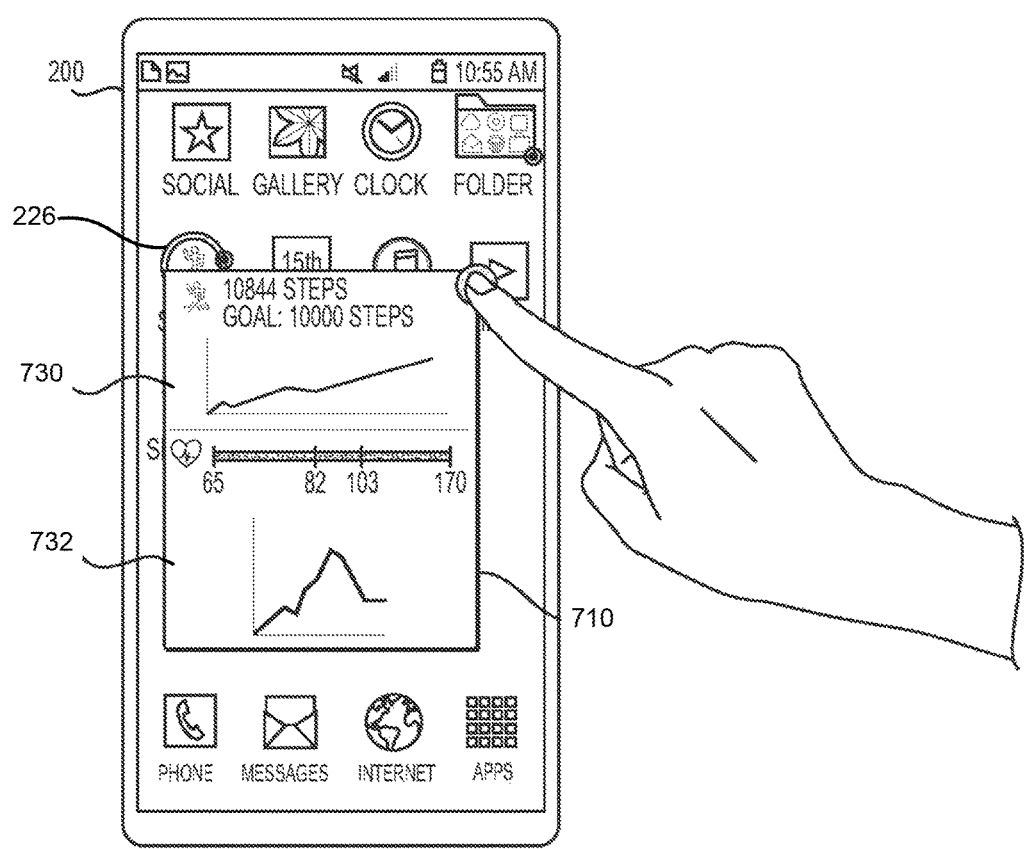

FIGS. 7A-D illustrate a user performing horizontal gesture 720, which functions to expand transient graphical object 710 by adding content elements to existing content objects. Transient graphical object 710 is rendered in its smallest form in FIG. 7B. In FIG. 7B, transient graphical object 710 includes two content objects 730 and 732 representing the user's step count and the user's heart rate in BPM respectively. As the user's gesture continues in FIGS. 7C and 7D, transient graphical object 710 expands by adding content elements to the content objects 730 and 732 from FIG. 7B. For example, in FIG. 7C, transient graphical object 710 includes a new content element in content object 730 representing a goal number of steps and a new content element in content object 732 representing a minimum, average, current, and maximum heart rate. In FIG. 7D, content elements including visual graphs are added to each of the content objects 730 and 732.

In particular embodiments, a transient graphical object may be rendered based on portions of a composite gesture. Each portion of a composite gesture may represent different functionality. As an example, a vertical portion of a gesture may function to expand the transient graphical object by adding content objects and a horizontal portion of a gesture may function to expand the transient graphical object by adding content elements to existing content objects. A user may perform a composite gesture that includes a first portion that is a vertical gesture and a second portion that is a horizontal gesture. Control module 130 may detect the composite gesture, determine the portions of the composite gesture, and in response to the first portion, expand the transient graphical object by adding one or more content objects, and in response to the second portion, expand the transient graphical object by adding content elements to the existing content objects.

In some particular embodiments, a composite gesture may be decomposed into portions by pattern recognition. For example, control module 130 may monitor for several different gesture patterns, and decompose a composite gesture into portions based on the similarity of the portions to the patterns. As an example, a composite gesture may be decomposed into vertical and horizontal portions, clockwise and counterclockwise portions, long presses and short taps, or any other suitable portions. In some embodiments, a portion of a gesture might be recognized along with a distance traveled along a path represented by a pattern, or a percentage of a pattern that the portion of the gesture includes. In some embodiments, a composite gesture may be represented by a vector and each portion of a composite gesture may be represented by a basis vector such that a composite gesture may be represented by a sum of basis vectors.

In some embodiments, control module 130 monitors for a portion of a composite gesture continuously and may render a transient graphical object, alter an existing transient graphical object, or remove a transient graphical object based on a portion of a gesture. As an example, a portion of a user's gesture may be a clockwise circular gesture, which may cause control module 130 to render a transient graphical object. The user may, at any time, continue to perform the clockwise circular gesture, which may cause control module 130 to expand the transient graphical object, or alternatively, the user may perform a counterclockwise circular gesture, which may cause control module 130 to display different content objects. Although this disclosure gives specific examples of composite gestures, this disclosure contemplates composite gesture that includes any number of portions, distinguished by any pattern, corresponding to any suitable functions, detected at any suitable time.

In particular embodiments, a gesture may be decomposed (e.g., separated into component parts) into separate values each representing a weight assigned to different functionalities. For example, a vertical gesture may function to expand the transient graphical object by adding content objects and a horizontal gesture may function to expand the transient graphical object by adding content elements to existing content objects. A user may perform a diagonal gesture that moves down and to the right. Based on this gesture, control module may decompose the gesture into a vertical part and a horizontal part (e.g., by vector decomposition). Each part may be assigned a weight corresponding to the vertical and horizontal parts of the diagonal gesture. Based on these weights, control module 130 may expand a transient graphical object by adding content objects and adding content elements to existing content objects, prioritizing these methods of expanding the transient graphical object based on the weights. As an example and not by way of limitation, if a user gestures diagonally and the final position of the user's finger is 6 cm to the right and 2 cm down from the original position, control module 130 may add one content object and add three content elements to existing content objects.

Although FIGS. 6A-E and FIGS. 7A-E illustrate particular gestures corresponding to a particular way to expand a transient graphical object, this disclosure contemplates any suitable decomposition of user input into portions that relate to any suitable way of expanding a transient graphical object. As an example, user input may be decomposed into gestures performed with one finger and gestures performed with two fingers. In this example, a one finger gesture may function to expand the transient graphical object by adding application-specific content and a two finger gesture may function to expand the transient graphical object by adding content derived from system-level data (e.g., battery usage, network usage, etc.). As another example, user input may be voice data. In this example, talking in a high voice may function to expand the transient graphical object by adding content that contains information and talking in a low voice may function to expand the transient graphical object by adding more graphical control objects for initiating actions. As another example, user input may be gestures a user performs that are received via a camera or other sensor, including gesture performed in three dimensions. For example, a user moving her left and right hands together may function to remove a transient graphical object, and a user moving her hands away from each other may serve to create or expand a transient graphical object.

Figure 8:
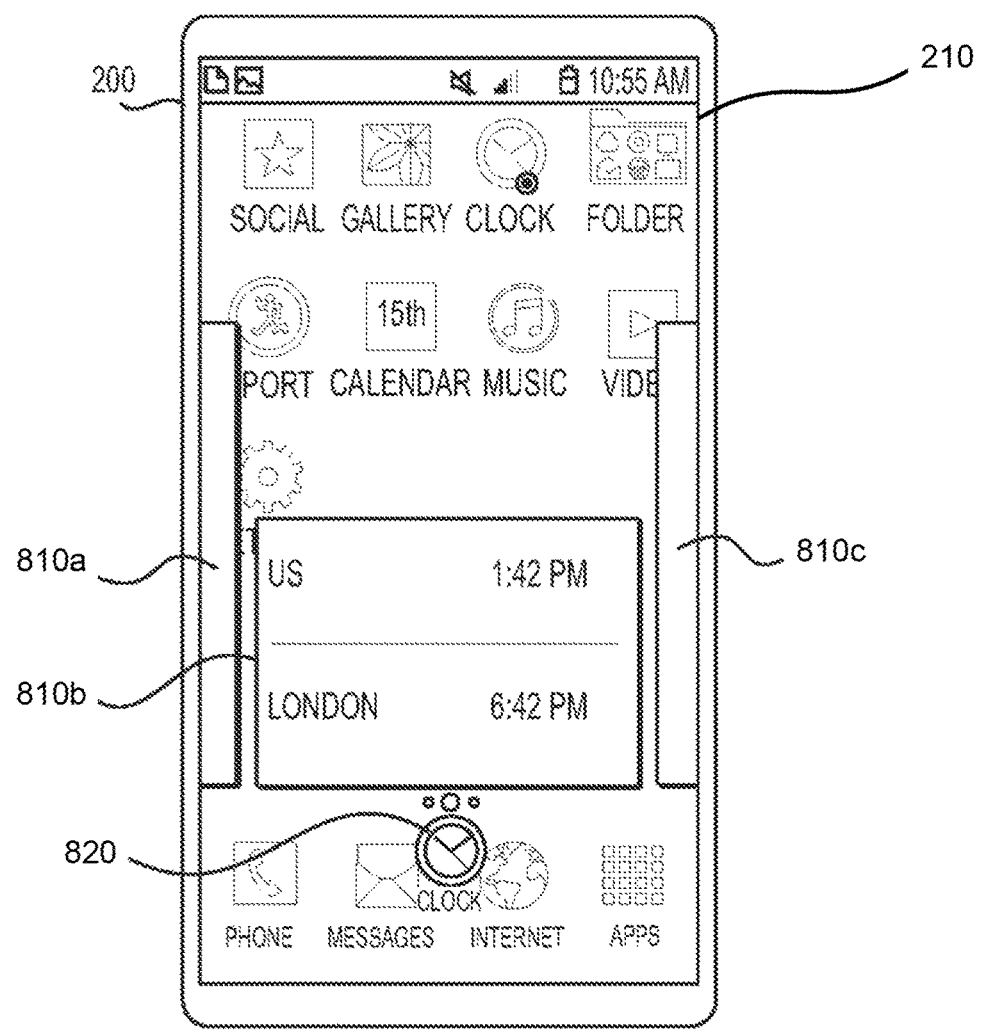
FIG. 8 illustrates an example of a transient graphical object rendered in a virtual space.

FIG. 8 illustrates an example transient graphical object 810 rendered in a virtual space where transient graphical object portion 810b is displayed on display 210. In particular embodiments, portions of a transient graphical object may be rendered in a virtual space (e.g., the transient graphical object may extend beyond the physical limits of a display through the use of software). In some embodiments, user device 200 may display different virtual spaces based on a user's gesture. For example, a user may swipe left or right to access virtual spaces that extend to the left and right of a display. For example, transient graphical object portions 810a and 810c may exist in virtual spaces that respectively extend to the left and right of display 210. In this example, a user may swipe left to access the virtual space containing transient graphical object 810a or swipe right to access the virtual space containing transient graphical object 810c (e.g., the view of display 210 may move to the left or right to display different virtual spaces). In some embodiments, virtual spaces may be a number of discrete frames (e.g., a user can switch between multiple discrete virtual spaces via user input) or continuous (e.g., where a user may pan or scroll to access virtual space beyond the display continuously). In some embodiments, discrete virtual spaces may each be associated with a category of content. In some embodiments, control module 130 may display different content in discrete virtual spaces based on user input.

In particular embodiments, each virtual space may be associated with a particular category of content. For example, as discussed above, a transient graphical object may be associated with multiple applications. In this example, different portions of the transient graphical object, each portion associated with a virtual space, may correspond to content from separate applications of the multiple applications. For example, a transient graphical object may be associated with both a clock application, such as the application represented by icon 820, and a music application. In this example, one portion of a transient graphical object may display content associated with the clock application and another portion of the transient graphical object may display content associated with the music application. Additionally or alternatively, a transient graphical object associated with multiple applications may combine content associated with different applications into one portion.

In particular embodiments, user device 200 may instantiate a virtual space in response to user input. For example, a user may gesture with a long press on an icon to bring up a transient graphical object for the corresponding first application. In this example, the user may then initiate a long press on another icon associated with a second application. User device 200 may then instantiate a virtual space and a transient graphical object associated with both the first and second application, where a portion of the transient graphical object in view contains content associated with the first application and a portion of the transient graphical object containing content associated with the second application exists in a virtual space to the right of the display. In particular embodiments, each virtual space associated with a portion of a transient graphical object may be initiated by executing a gesture associated with that virtual space. For example, a clockwise gesture on an icon may initiate a portion of a transient graphical object associated with a first virtual space, while a counterclockwise gesture may initiate a different portion of the transient graphical object associated with a second virtual space. In some embodiments, a portion of a transient graphical object is placed into a virtual space based on user input. For example, a user may place a portion of a transient graphical object in a virtual space to the left of the display via gesturing to the left. In some embodiments, a virtual space may be instantiated when a transient graphical object is instantiated. Additionally or alternatively, a virtual space may be instantiated after a transient graphical object has been instantiated. Although particular ways of instantiating a virtual space are discussed, this disclosure contemplates any suitable manner of instantiating a virtual space.

Figure 9:
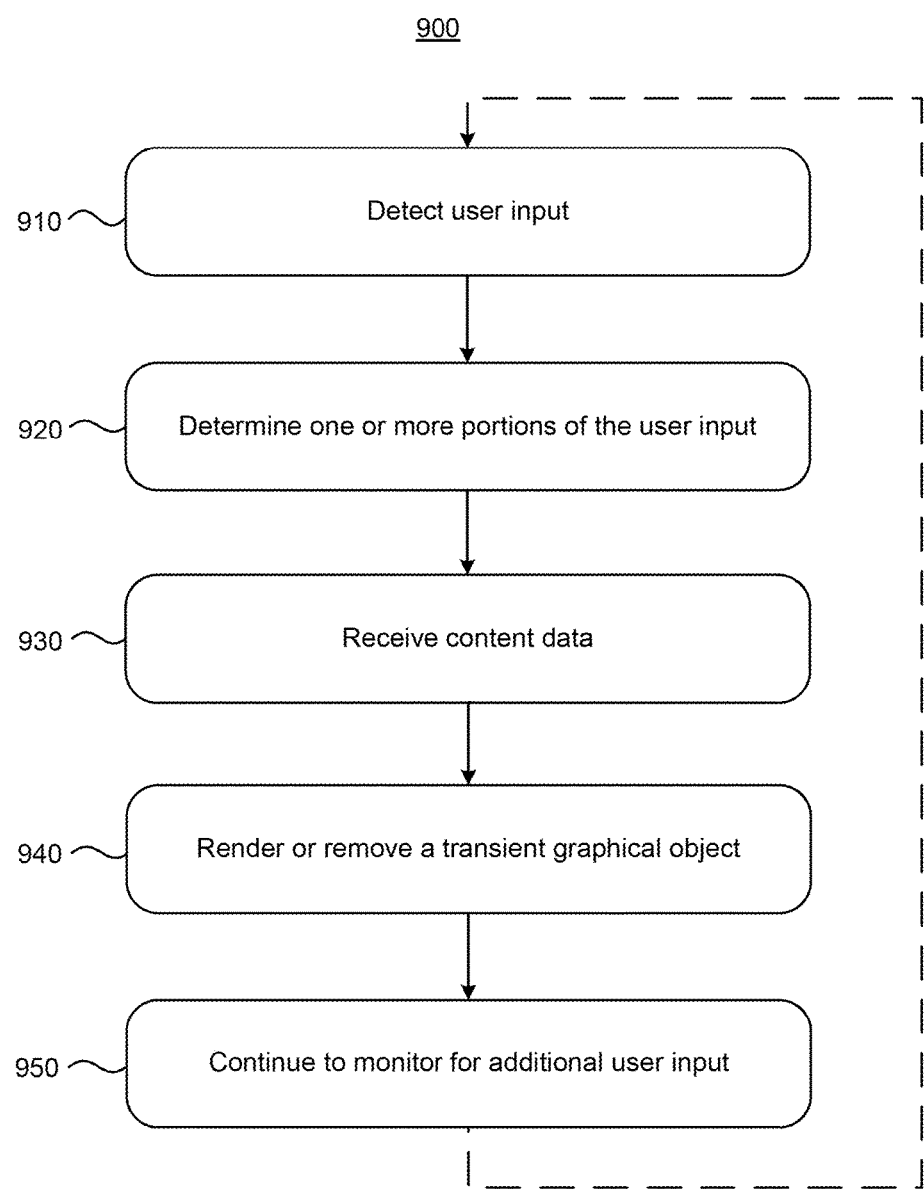
FIG. 9 illustrates an example method for rendering a transient graphical object.

FIG. 9 illustrates an example method 900 for rendering a transient graphical object. In step 910, control module 130 detects a user input. In particular embodiments, control module 130 may detect user input by receiving data indicative of user input from the operating system or from UI API 160. A user input may include a gesture, voice data, or any other suitable user input.

In step 920, control module 130 determines one or more portions of the user input detected in step 910. In some embodiments, user input portions may be identified based on characteristics that differ for each portion. For example, user input including a composite gesture may have different portions that are characterized by different directions or gesture types.

In step 930, control module 130 receives content data. In particular embodiments, the control module 130 may check whether an application provides custom content (e.g., via a configuration data file, a background service, a broadcast receiver, etc.) that responds to requests for custom content. In another embodiment, application 150 may notify control module 130 that application 150 provides custom content. In some embodiments, control module 130 may receive content data from system-level data or online data. In some embodiments, control module 130 may generate the content of a transient graphical object in advance of user input to create the transient graphical object, which may be formatted, cached, or stored for retrieval when needed (e.g., in a data store).

In step 940, control module 130 may render or remove a transient graphical object based on the content received in step 930 and the one or more portions of the user input determined in step 920. For example, there may be user input in the form of a gesture that initiates a transient graphical object, such as a long press or a double tap. As another example, certain gestures may function to expand or contract a transient graphical object. As described above, transient graphical object may expand or contract in different ways depending on the type or direction of a gesture (e.g., expanding a transient graphical object differently based on whether a gesture is vertical or horizontal).

In particular embodiments, a transient graphical object may be altered by a user via user input. For example, a transient graphical object may include several content objects. User input in the form of gestures may change the rendering of the transient graphical object. For example, a gesture including a swipe to the right performed on a content object may dismiss the content object. As another example, a gesture downward may cause more or different content objects to be rendered. As another example, a gesture to the left or right originating from a content object displaying content associated with a category may cause control module 130 to change the content object to display content associated with a different category.

In particular embodiments, control module 130 may remove a transient graphical object based on user input receive in step 920. For example, a gesture including a tap on the display outside the transient graphical object may cause control module 130 to remove the transient graphical object and return to the initial screen. Other examples of gestures that may cause control module 130 to remove a transient graphical object may include making a specific gesture (e.g., swiping the transient graphical object off the screen), tapping a hardware button (e.g., a back button of user device 200), or any other suitable user input. In some embodiments, a transient graphical object may be removed automatically under certain conditions (e.g., when a specified amount of time elapses, when user device 200 enters sleep mode, etc.).

In step 950, control module may continue to monitor for additional user input. Such user input may be detected, and a transient graphical object may be rendered or removed in response to the user input. For example, transient graphical object may be already rendered when a user performs a gesture that causes control module 130 to remove the transient graphical object. As another example, a user may configure the content of a rendered transient graphical object via additional user input.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for rendering a transient graphical object including the particular steps of the method of FIG. 9, this disclosure contemplates any suitable method for rendering a transient graphical object including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
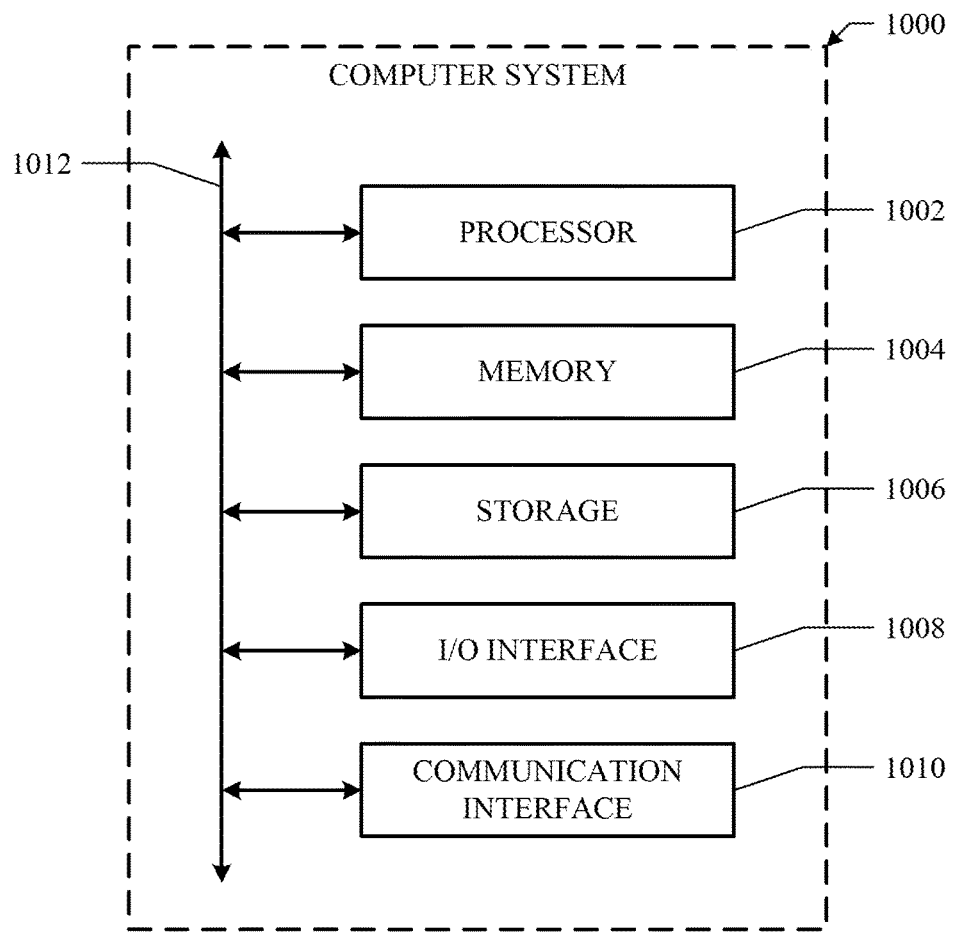
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A non-transitory computer-readable storage media embodying instructions that when executed by one or more processors cause the one or more processors to perform operations comprising:

detecting user input comprising a gesture linked to a portion of a graphical user interface associated with one or more applications;

decomposing at least part of the gesture into a first vector representing a first portion of the gesture in a first dimension and a second vector representing a second portion of the gesture in a second dimension that is different than the first dimension; and rendering, in response to the detected user input, at least a portion of a transient graphical object comprising a plurality of portions, each portion associated with a different virtual space and containing content comprising:

information linked to a particular one of the one or more applications, the information comprising one or more content objects, each content object comprising one or more content elements; and one or more graphical control objects for initiating one or more actions linked to the particular application, wherein:

a number of content objects displayed by the transient graphical object increases as a magnitude of the first vector representing the first portion of the gesture in the first dimension increases; and a number of content elements associated with at least one content object increases as a magnitude of the second vector representing the second portion of the gesture in the second dimension that is different than the first dimension increases.

2. The non-transitory computer-readable storage media of claim 1, wherein the content comprises user-configurable content.

3. The non-transitory computer-readable storage media of claim 1, wherein:

each portion of the transient graphical object is associated with a distinct user input;

the operations further comprise determining the portion of the transient graphical object associated with the detected user input; and rendering at least a portion of a transient graphical object comprises rendering at least the portion associated with the detected user input.

4. The non-transitory computer-readable storage media of claim 1, wherein:

the content displayed by each portion of the transient graphical object is defined at least in part by a content category; and each portion of the transient graphical object is associated with a different content category.

5. The non-transitory computer-readable storage media of claim 1, wherein the portion of the graphical user interface comprises an icon particular to one of the applications.

6. The non-transitory computer-readable storage media of claim 1, wherein:

the gesture is made by at least part of the user, the gesture starting at the portion of the graphical user interface;

a size of the transient graphical object increases as a distance of the at least part of the user from the portion of the graphical user interface increases and decreases as the distance of the at least part of the user from the portion of the graphical user interface decreases; and an amount of content displayed is based on the size of the transient graphical object.

7. The non-transitory computer-readable storage media of claim 1, wherein:

the second vector is associated with a first type of content element; and a third vector is associated with a second type of content element, the second type being different than the first type and the third vector associated with a dimension that is different than the second dimension.

8. The non-transitory computer-readable storage media of claim 1, wherein:
the first dimension is substantially perpendicular to the second dimension.

9. The non-transitory computer-readable storage media of claim 8, wherein:
the first vector is in a vertical direction relative to the graphical user interface and the second vector is in a horizontal direction relative to the graphical user interface; or
the first vector corresponds to a clockwise movement and the second vector corresponds to a counterclockwise movement.

10. The non-transitory computer-readable storage media of claim 1, wherein the operations further comprise:
determining whether content is available for a particular one of the one or more applications; and
rendering, in response to a determination that content is available for the particular application, a visual indicator on or near an icon associated with the particular application.

11. The non-transitory computer-readable storage media of claim 1, wherein:
the one or more applications comprise a plurality of applications; and
the content further comprises information particular to a second one of the plurality of applications.

12. The non-transitory computer-readable storage media of claim 1, wherein the information comprises one or more of:
first information obtained from the particular application;
second information obtained from system-level data; or
third information obtained from online data.

13. The non-transitory computer-readable storage media of claim 1, wherein the information is based on a context of a device comprising a display displaying the graphical user interface.

14. The non-transitory computer-readable storage media of claim 1, wherein:
the gesture comprises a continuous contact between the user and a display displaying the graphical user interface; and
the operations further comprising removing the transient graphical object in response to a separation between the user and the display.

15. A method comprising:
detecting user input comprising a gesture linked to a portion of a graphical user interface associated with one or more applications;
decomposing at least part of the gesture into a first vector representing a first portion of the gesture in a first dimension and a second vector representing a second portion of the gesture in a second dimension that is different than the first dimension; and
rendering, in response to the detected user input, at least a portion of a transient graphical object comprising a plurality of portions, each portion associated with a different virtual space and containing content comprising:
information linked to a particular one of the one or more applications, the information comprising one or more content objects, each content object comprising one or more content elements; and
one or more graphical control objects for initiating one or more actions linked to the particular application
wherein:
a number of content objects displayed by the transient graphical object increases as a magnitude of the first vector representing the first portion of the gesture in the first dimension increases; and
a number of content elements associated with at least one content object increases as a magnitude of the second vector representing the second portion of the gesture in the second dimension that is different than the first dimension increases.

16. The method of claim 15, wherein:
each portion of the transient graphical object is associated with a distinct user input;
the method further comprises determining the portion of the transient graphical object associated with the detected user input; and
rendering at least a portion of a transient graphical object comprises rendering at least the portion associated with the detected user input.

17. The method of claim 15, wherein:
the gesture is made by at least part of the user, the gesture starting at the portion of the graphical user interface;
a size of the transient graphical object increases as a distance of the at least part of the user from the portion of the graphical user interface increases and decreases as the distance of the at least part of the user from the portion of the graphical user interface decreases; and
an amount of content displayed is based on the size of the transient graphical object.

18. An apparatus comprising:
one or more computer-readable non-transitory storage media embodying instructions; and
one or more processors configured to execute the instructions to:
detect user input comprising a gesture linked to a portion of a graphical user interface associated with one or more applications;
decompose at least part of the gesture into a first vector representing a first portion of the gesture in a first dimension and a second vector representing a second portion of the gesture in a second dimension that is different than the first dimension; and
render, in response to the detected user input, at least a portion of a transient graphical object comprising a plurality of portions, each portion associated with a different virtual space and containing content comprising:
information linked to a particular one of the one or more applications, the information comprising one or more content objects, each content object comprising one or more content elements; and
one or more graphical control objects for initiating one or more actions linked to the particular application
wherein:
a number of content objects displayed by the transient graphical object increases as a magnitude of the first vector representing the first portion of the gesture in the first dimension increases; and
a number of content elements associated with at least one content object increases as a magnitude of the second vector representing the second portion of the gesture in the second dimension that is different than the first dimension increases.

19. The apparatus of claim 18, wherein:
each portion of the transient graphical object is associated with a distinct user input; and
the processors are further configured to execute the instructions to:
  determine the portion of the transient graphical object associated with the detected user input; and
  render at least the portion associated with the detected user input.

20. The apparatus of claim 18, wherein:
the gesture is made by at least part of the user, the gesture starting at the portion of the graphical user interface;
a size of the transient graphical object increases as a distance of the at least part of the user from the portion of the graphical user interface increases and decreases as the distance of the at least part of the user from the portion of the graphical user interface decreases; and
an amount of content displayed is based on the size of the transient graphical object.

* * * * *